(12) United States Patent
Naniwa et al.

(10) Patent No.: US 8,270,262 B2
(45) Date of Patent: Sep. 18, 2012

(54) THERMALLY ASSISTED MAGNETIC RECORDING HEAD AND HEAD ASSEMBLY

(75) Inventors: Irizo Naniwa, Fujisawa (JP); Takuya Matsumoto, Hachioji (JP); Satoshi Arai, Yokohama (JP); Junichiro Shimizu, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/995,253

(22) PCT Filed: Jun. 1, 2009

(86) PCT No.: PCT/JP2009/059968
§ 371 (c)(1),
(2), (4) Date: Feb. 14, 2011

(87) PCT Pub. No.: WO2009/148012
PCT Pub. Date: Dec. 10, 2009

(65) Prior Publication Data
US 2011/0149698 A1  Jun. 23, 2011

(30) Foreign Application Priority Data
Jun. 2, 2008 (JP) .................. 2008-144902

(51) Int. Cl.
*G11B 7/085* (2006.01)
(52) U.S. Cl. .................................................. 369/30.03
(58) Field of Classification Search ........................ None
See application file for complete search history.

(56) References Cited

U.S. PATENT DOCUMENTS

| | | | |
|---|---|---|---|
| 6,239,947 B1 | 5/2001 | Fan et al. | |
| 6,320,841 B1 * | 11/2001 | Watanabe et al. | 369/300 |
| 6,400,529 B1 | 6/2002 | Baba et al. | |
| 7,277,259 B2 | 10/2007 | Yamamoto et al. | |
| 7,538,978 B2 | 5/2009 | Sato et al. | |
| 7,864,635 B2 | 1/2011 | Shimizu | |
| 8,014,096 B2 * | 9/2011 | Huang et al. | 360/59 |
| 2001/0017820 A1 * | 8/2001 | Akiyama et al. | 369/13 |
| 2004/0228022 A1 * | 11/2004 | Ueyanagi | 360/59 |
| 2005/0056856 A1 * | 3/2005 | Yamazaki et al. | 257/98 |
| 2005/0191526 A1 * | 9/2005 | Fujita et al. | 428/848.5 |
| 2005/0213239 A1 * | 9/2005 | Hibi et al. | 360/48 |
| 2007/0153417 A1 * | 7/2007 | Suh et al. | 360/125 |
| 2008/0056073 A1 | 3/2008 | Shimizu | |
| 2008/0074776 A1 * | 3/2008 | Soeya | 360/59 |
| 2008/0316872 A1 | 12/2008 | Shimizu et al. | |

FOREIGN PATENT DOCUMENTS

| | | |
|---|---|---|
| JP | 10-124839 A | 5/1998 |
| JP | 10124839 A | 5/1998 |
| JP | 2000-011558 A | 1/2000 |
| JP | 2001-023138 A | 1/2001 |
| JP | 2002-050073 A | 2/2002 |
| JP | 2004-241057 A | 8/2004 |
| JP | 2006-185548 A | 7/2006 |
| JP | 2007-335027 A | 12/2007 |

(Continued)

*Primary Examiner* — Joseph Feild
*Assistant Examiner* — Henok Heyi
(74) *Attorney, Agent, or Firm* — Volpe and Koenig, P.C.

(57) ABSTRACT

In a thermally assisted magnetic recording head (10A), a sub-mount (8A) on which a laser diode is mounted is arranged between an HGA (41) and a magnetic head slider (9). The sub-mount has a wiring line (81) which electrically connects a terminal (91) arranged on the magnetic head slider (9) and a terminal (411) arranged on the HGA (41).

13 Claims, 21 Drawing Sheets

FOREIGN PATENT DOCUMENTS

| JP | 2007335027 A | 12/2007 |
| JP | 2008-010026 A | 1/2008 |
| JP | 2008-010094 A | 1/2008 |
| JP | 2008-016096 A | 1/2008 |
| JP | 2008-059645 A | 3/2008 |
| JP | 2008059645 A | 3/2008 |
| JP | 2009004030 A | 1/2009 |

* cited by examiner

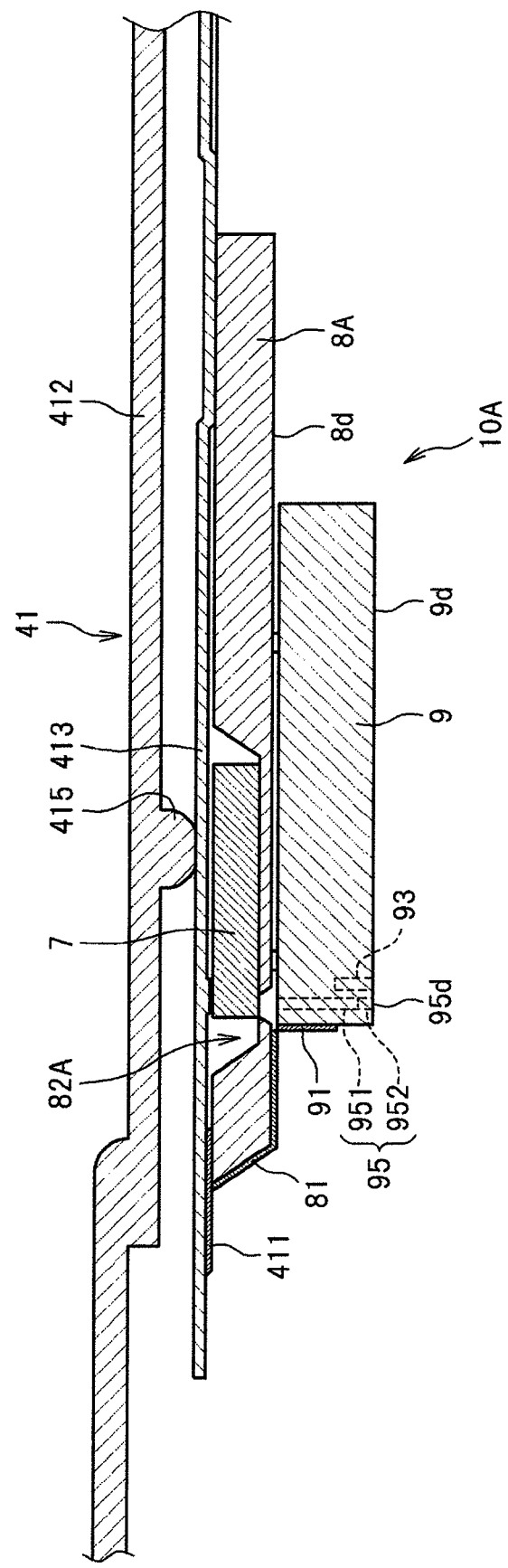

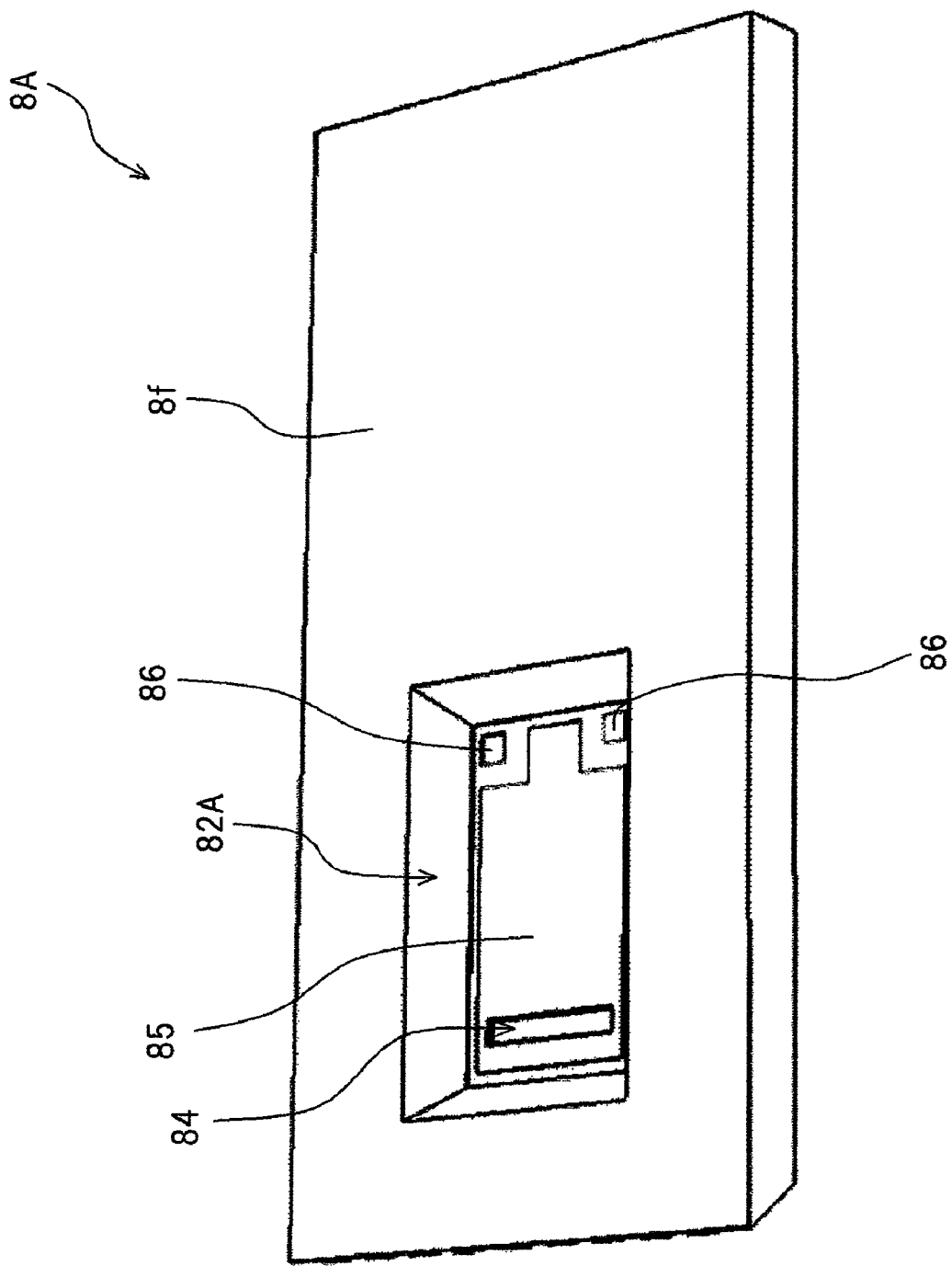

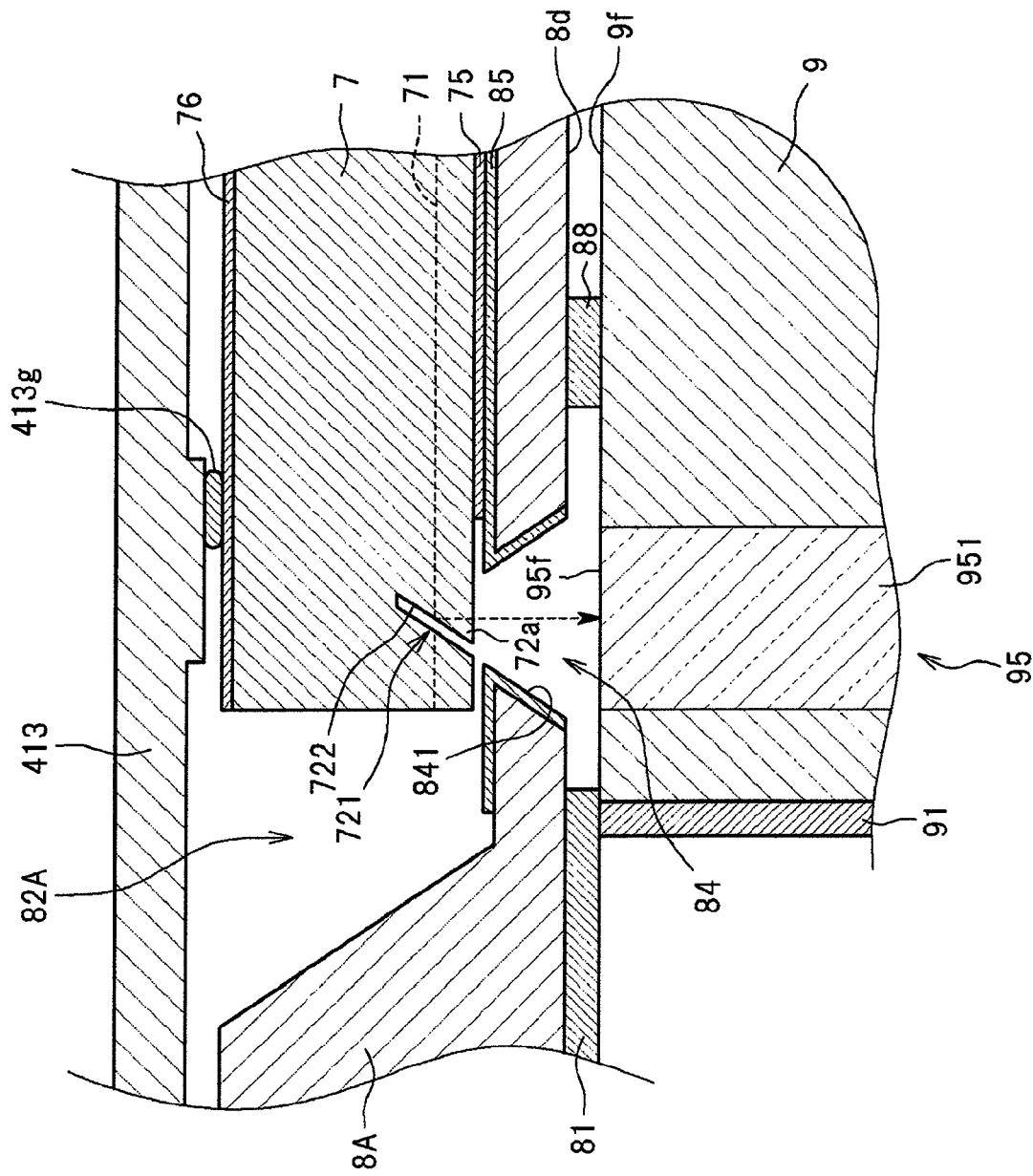

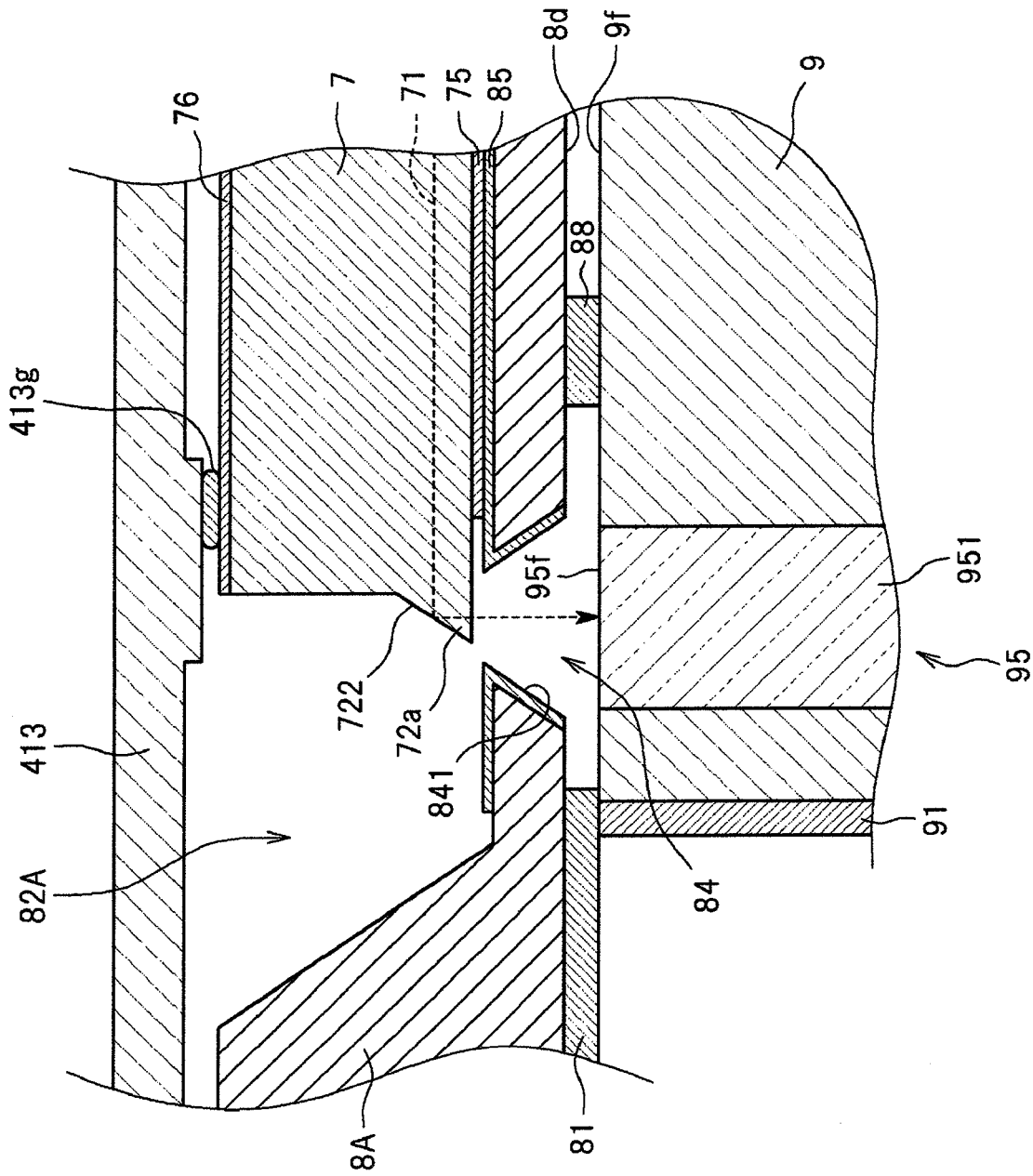

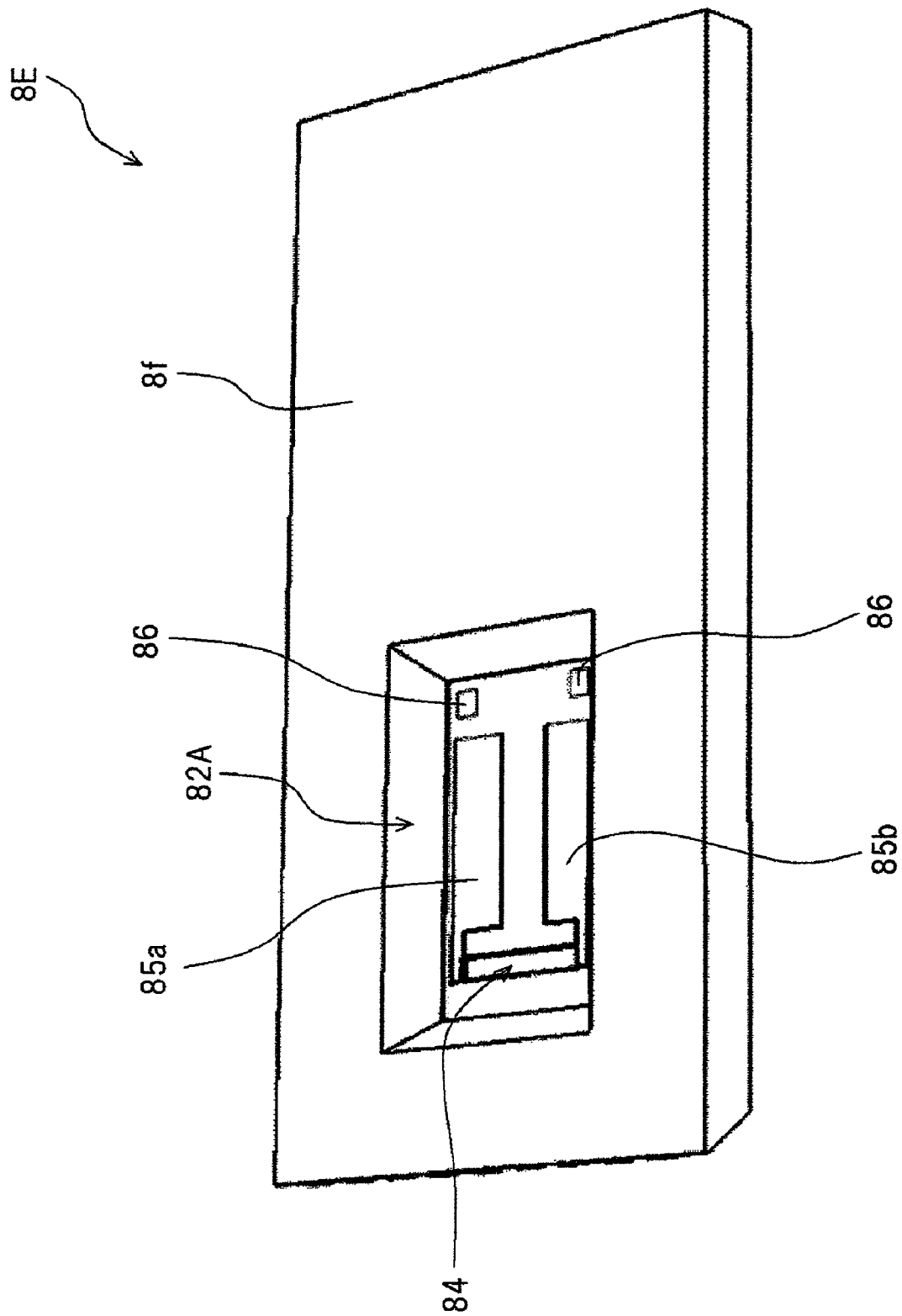

THERMALLY ASSISTED MAGNETIC RECORDING HEAD AND HEAD ASSEMBLY

INCORPORATION BY REFERENCE

The present application claims priority from Japanese application JP2008-144902 filed on Jun. 2, 2008 the content of which is hereby incorporated by reference into this application.

TECHNICAL FIELD

The present invention relates to a thermally assisted magnetic recording head and a head assembly, and more particularly to a technique for providing a sub-mount for mounting a light emitting element.

BACKGROUND ART

Recently, as one technique for improving a recording density of a magnetic disk device, a thermally assisted magnetic recording has been proposed. This thermally assisted magnetic recording is a technique for applying a magnetic field and heat to a small region of a recording medium to record data. As a method for heating a small region of a recording medium, a near-field optical element is considered. This near-field optical element is provided near a magnetic recording element of a head slider, and converts light introduced from an external light emitting element into near-field light for output, thereby heating a small region of a recording medium. In JP-A-2007-335027, there is disclosed a thermally assisted magnetic recording head on which a sub-mount for mounting a light emitting element between a head supporting member and a head slider is provided.

CITATION LIST

Patent Literature
  Patent Literature 1: JP-A-2007-335027

SUMMARY OF INVENTION

Technical Problem

However, there is the following problem. That is, when a sub-mount is provided between a head supporting member and a head slider as in the above-described conventional thermally assisted magnetic recording head, since a terminal arranged on the head supporting member and a terminal arranged on the head slider are separated from each other by a thickness as much as that of the sub-mount, it is difficult that both of these terminals are electrically connected.

In view of the foregoing, it is a main object of the present invention to provide a thermally assisted magnetic recording head and head assembly capable of electrically connecting a terminal arranged on the head slider and a terminal arranged on the head supporting member in an appropriate manner in the thermally assisted magnetic recording head having arranged thereon the sub-mount for mounting a light emitting element.

Solution to Problem

To accomplish the above-described objects, according to one aspect of the present invention, there is provided a thermally assisted magnetic recording head. This thermally assisted magnetic recording head includes: a light emitting element; a sub-mount on which the light emitting element is mounted and which is mounted on a head supporting member; and a head slider which includes at least a magnetic recording element and is mounted on the sub-mount, and which receives light emitted by the light emitting element and includes a photoelectric converter emitting near-field light from a recording medium-facing surface facing a recording medium, wherein the sub-mount has a wiring line which electrically connects a terminal arranged on the head slider and a terminal arranged on the head supporting member.

A head assembly of the present invention includes the thermally assisted magnetic recording head of the present invention.

According to one aspect of the present invention, the sub-mount has a wiring line which electrically connects a terminal arranged on the light emitting element and a terminal arranged on the head supporting member.

According to another aspect of the present invention, a concave portion which opens to the head supporting member side and in which the light emitting element is stored and a through-hole which penetrates from a bottom part of the concave portion up to the head slider side are formed in the sub-mount; and light emitted by the light emitting element stored in the concave portion passes through the through-hole, and enters a receiving surface of the photoelectric converter, formed on a surface on the sub-mount side of the head slider.

According to this aspect of the present invention, wherein the light emitting element is a laser diode in which an output end for emitting light in the direction bisecting a resonator direction is formed, and stored in the concave portion such that the resonator direction is approximately parallel to a bottom part of the concave portion to thereby emit light from the output end toward the through-hole.

According to this aspect of the present invention, a first wiring line connected to a terminal arranged on the light emitting element is formed on a bottom part of the concave portion; a second wiring line connected to a terminal arranged on the head supporting member is formed on a surface of the head slider side of the sub-mount; and a wiring line within the through-hole one end of which is connected to the first wiring line and the other end of which is connected to the second wiring line is formed on a sidewall of the through-hole.

According to this aspect of the present invention, a terminal arranged on one main surface of the light emitting element is connected to the first wiring line formed on a bottom part of the concave portion; and a terminal arranged on the other main surface of the light emitting element is grounded to the head supporting member.

Alternatively, a plurality of first wiring lines connected respectively to a plurality of terminals arranged on one main surface of the light emitting element are formed on a bottom part of the concave portion; a plurality of second wiring lines connected respectively to a plurality of terminals arranged on the head supporting member are formed on a surface of the head slider side of the sub-mount; and a plurality of wiring lines within the through-hole one ends of which are connected respectively to the plurality of first wiring lines and the other ends of which are connected respectively to the plurality of second wiring lines are formed on a sidewall of the through-hole.

According to this aspect of the present invention, a waveguide member having translucency with respect to light emitted by the light emitting element is filled in the through-hole.

According to this aspect of the present invention, a lens which condenses light emitted by the light emitting element toward a receiving surface of the photoelectric converter is provided in the through-hole.

According to yet another aspect of the present invention, a concave portion which opens to the head slider side and in which the light emitting element is stored is formed on the sub-mount; and light emitted by the light emitting element stored in the concave portion enters a receiving surface of the photoelectric converter, formed on a surface of the sub-mount side of the head slider.

According to this aspect of the present invention, the light emitting element is a laser diode in which an output end for emitting light in the direction bisecting a resonator direction is formed, and stored in the concave portion such that the resonator direction is approximately parallel to a bottom part of the concave portion to thereby emit light from the output end toward a receiving surface of the photoelectric converter.

According to this aspect of the present invention, a plurality of first wiring lines connected respectively to a plurality of terminals arranged on one main surface of the light emitting element are formed on a bottom part of the concave portion; a plurality of second wiring lines connected respectively to a plurality of terminals arranged on the head supporting member are formed on a surface of the head slider side of the sub-mount; and a plurality of sidewall wiring lines one ends of which are connected respectively to the plurality of first wiring lines and the other ends of which are connected respectively to the plurality of second wiring lines are formed on a side part of the concave portion.

According to yet another aspect of the present invention, a pedestal arranged between the sub-mount and the head slider, and a mirror are formed on a facing surface through which the sub-mount faces the head slider; the light emitting element is mounted on the facing surface so as to emit light toward the mirror; and light emitted by the light emitting element is turned over by the mirror, and enters a receiving surface of the photoelectric converter, formed on a surface of the sub-mount side of the head slider.

According to this aspect of the present invention, the pedestal is composed of a waveguide member having translucency with respect to light emitted by the light emitting element; and after passing through the pedestal, light emitted by the light emitting element is turned over by the mirror and enters a receiving surface of the photoelectric converter.

According to yet another aspect of the present invention, a convex portion is formed on a mounting surface on which the head slider of the sub-mount is mounted; and the head slider is bonded to the mounting surface with a part of the head slider contacting a top face of the convex portion.

Advantageous Effects of Invention

According to the present invention, the sub-mount arranged between the head supporting member and the head slider has a wiring line which electrically connects a terminal arranged on the head slider and a terminal arranged on the head supporting member. Therefore, even if separated from each other, the above-described terminals can be electrically connected through this wiring line in an appropriate manner.

Other objects, features and advantages of the invention will become apparent from the following description of the embodiments of the invention taken in conjunction with the accompanying drawings.

BRIEF DESCRIPTION OF DRAWINGS

FIG. 3 is a cross-sectional view illustrating the thermally assisted magnetic recording head according to the first embodiment;

FIG. 4A is a perspective view illustrating an upper surface side of a sub-mount included in the thermally assisted magnetic recording head according to the first embodiment;

FIG. 5A is an enlarged cross-sectional view of the thermally assisted magnetic recording head according to the first embodiment;

FIG. 5B is an enlarged cross-sectional view of the thermally assisted magnetic recording head according to the first embodiment;

FIG. 6A is a perspective view illustrating an upper surface side of the sub-mount included in the thermally assisted magnetic recording head according to a modification example of the first embodiment;

DESCRIPTION OF EMBODIMENTS

Preferred embodiments of the present invention will be described with reference to the accompanying drawings of the embodiments.

Figure 1:
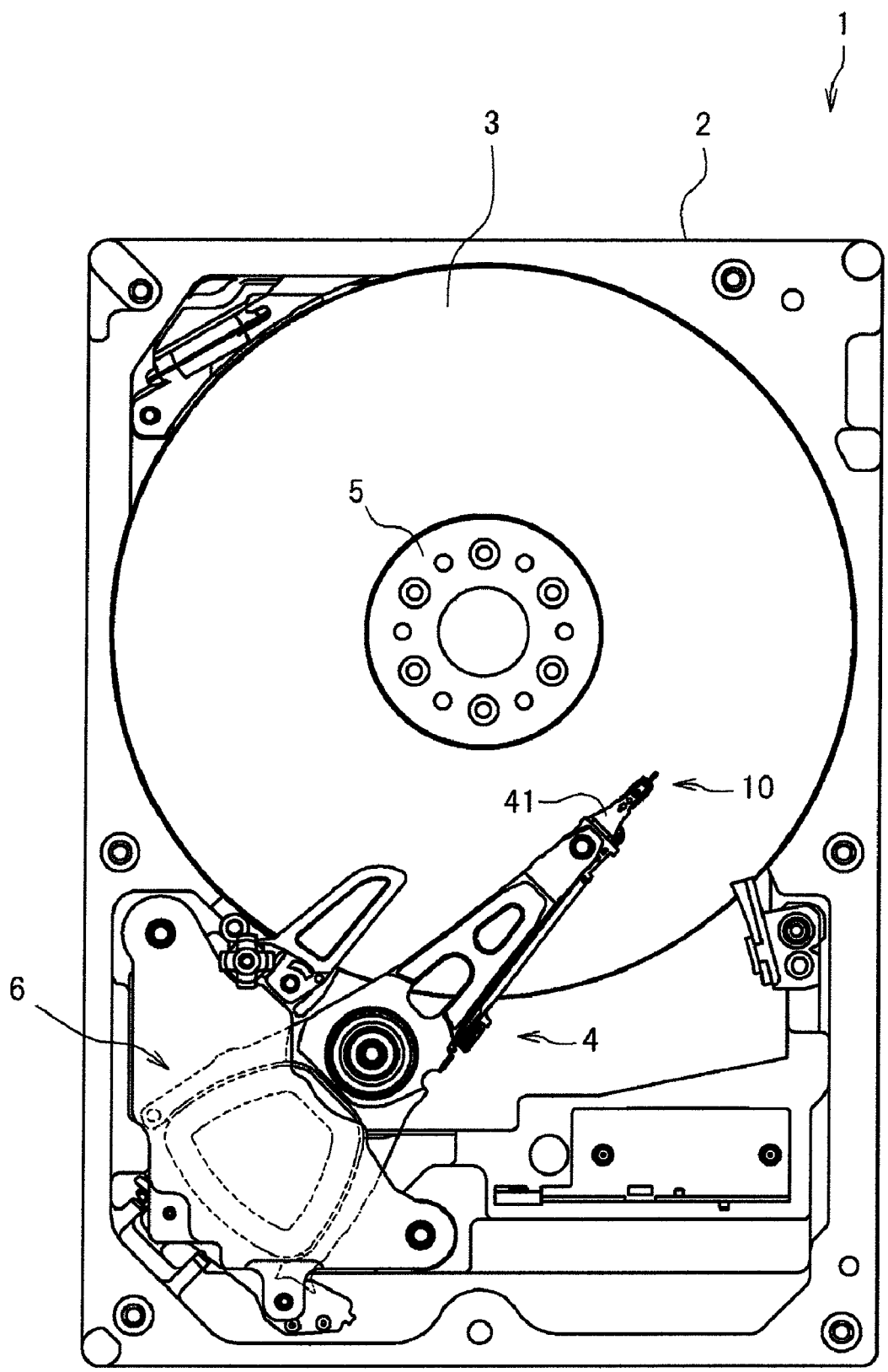
FIG. 1 is a plan view illustrating a magnetic disk device having a head assembly according to one embodiment of the present invention.

FIG. 1 is a plan view illustrating a magnetic disk device including a head assembly according to one embodiment of the present invention. In the same figure, illustration of a top cover is omitted.

In a chassis 2 of the magnetic disk device 1, a magnetic disk 3 and a head assembly 4 are stored. The magnetic disk 3 is mounted on a spindle motor 5 provided on a bottom part of the chassis 2. The head assembly 4 is supported rotatably on a bottom part of the chassis 2 next to the magnetic disk 3.

On a tip side of the head assembly 4, a head gimbal assembly (HGA) 41 serving as a head supporting member for supporting a thermally assisted magnetic recording head 10 according to one embodiment of the present invention is mounted. This thermally assisted magnetic recording head 10 is floated closely to the magnetic disk 3 and applies a magnetic field and heat to a predetermined region of the magnetic disk 3 to thereby record data.

On the other hand, a voice coil motor 6 is provided on the rear end side of the head assembly 4. The voice coil motor 6 rotatably drives the head assembly 4, and moves the thermally assisted magnetic recording head 10 on the magnetic disk 3 in an almost radius direction.

(First Embodiment of Thermally Assisted Magnetic Recording Head)

Hereinafter, a first embodiment (defined as a thermally assisted magnetic recording head 10A) of the thermally assisted magnetic recording head 10 according to one embodiment of the present invention will be described.

Figure 2:
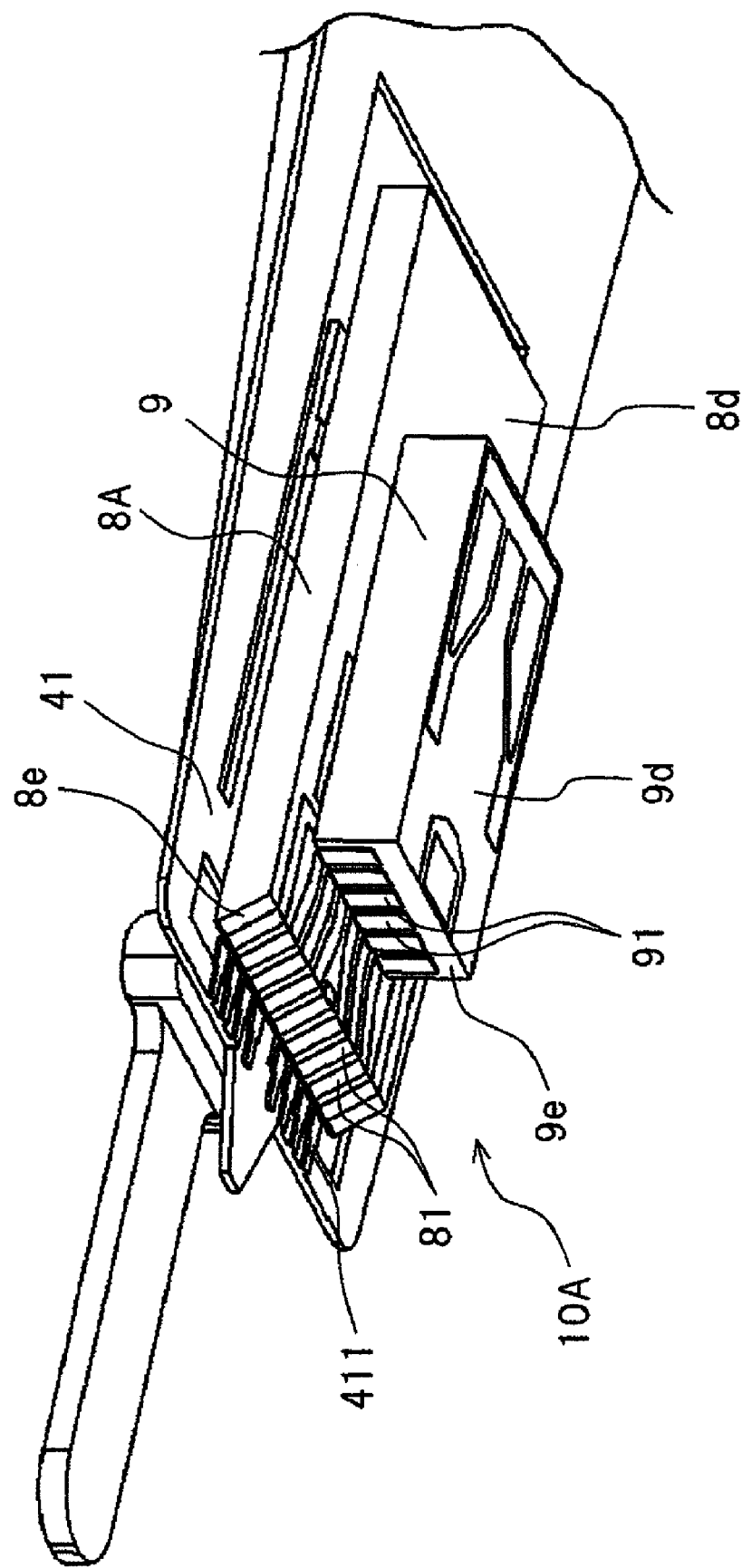
FIG. 2 is a perspective view illustrating a thermally assisted magnetic recording head (first embodiment) according to one embodiment of the present invention.
Figure 4B:
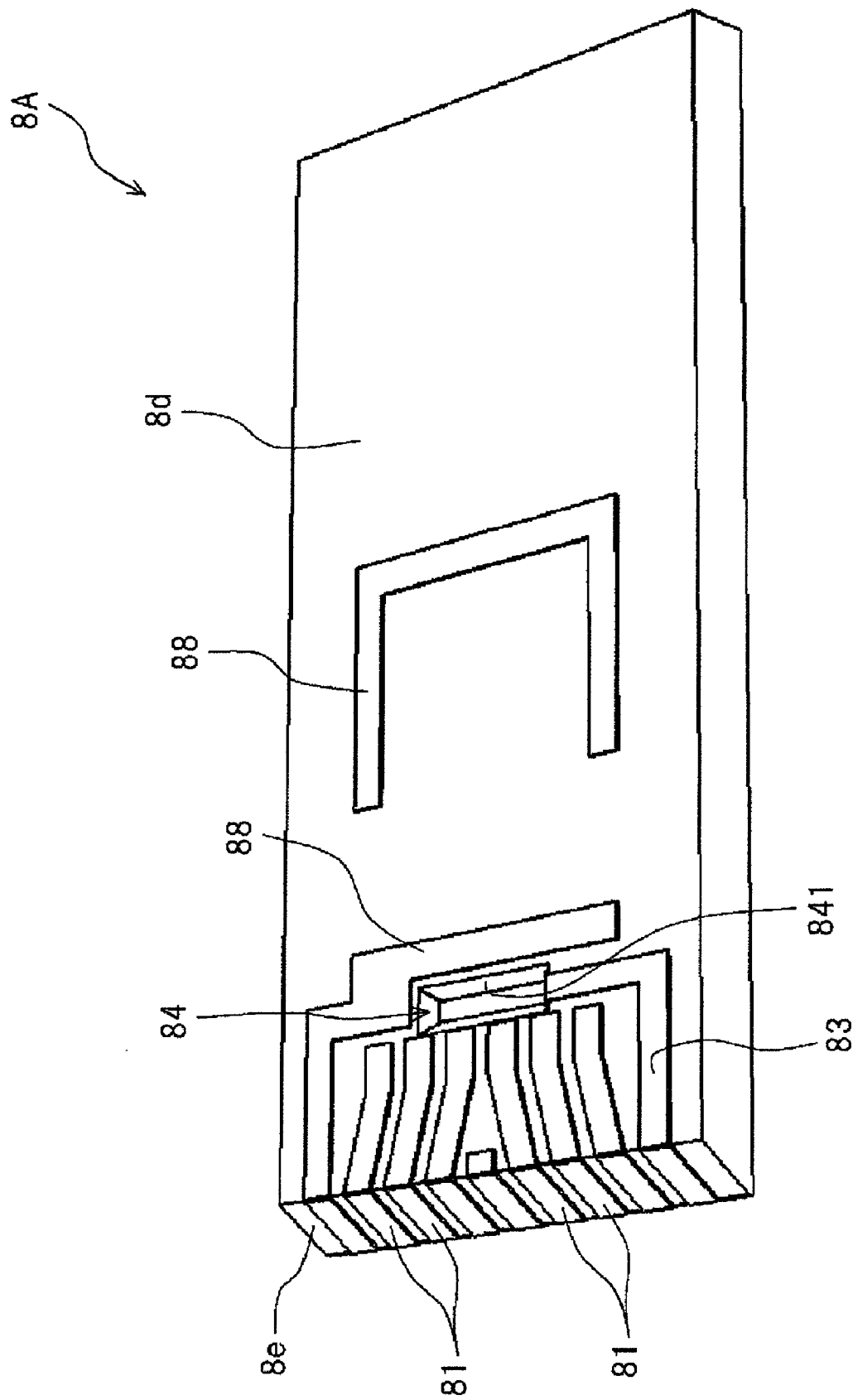
FIG. 4B is a perspective view illustrating a lower surface side of the sub-mount included in the thermally assisted magnetic recording head according to the first embodiment.

FIGS. 2 and 3 are a perspective view and cross sectional view of the thermally assisted magnetic recording head 10A. These figures illustrate the thermally assisted magnetic recording head 10A in the state mounted on the HGA 41. Further, in FIG. 3 described above, there is schematically illustrated a cross-sectional surface at the time when the thermally assisted magnetic recording head 10 is cut at a central part in a width direction. FIGS. 4A and 4B are perspective views illustrating an upper surface side and lower surface side of a sub-mount 8A included in the thermally assisted magnetic recording head 10A. FIG. 5A is an enlarged view of an essential part of FIG. 3A described above.

Note that in the following description, the HGA 41 side is defined as an upper side and the magnetic disk 3 side is defined as a lower side with respect to the thermally assisted magnetic recording head 10A. Further, in the thermally assisted magnetic recording head 10A, a side (namely, an air outflow side) corresponding to a tip side of the HGA 41 is defined as a front side and a side corresponding to a reverse side of the HGA 41 is defined as a backward side.

The thermally assisted magnetic recording head 10A has the rectangular-plate shaped sub-mount 8A on which a laser diode 7 serving as a light emitting element is mounted and a flat cuboid shaped magnetic head slider 9 including a magnetic recording element 93 and a photoelectric converter 95. In this thermally assisted magnetic recording head 10A, the sub-mount 8A is mounted on a lower side of the HGA 41 and the magnetic head slider 9 is mounted on a lower surface 8d of this sub-mount 8A. Specifically, in the HGA 41, a flexure 413 is joined to a lower end of a dimple 415 formed on a load beam 412 and the sub-mount 8A is mounted on a lower surface of this flexure 413.

The magnetic head slider 9 has an ABS (air bearing surface) on a recording medium-facing surface 9d as a lower surface, and is floated above the rotated magnetic disk 3 due to a wedge film effect of air. This magnetic head slider 9 includes the magnetic recording element 93 and the photoelectric converter 95 in the front side (air outflow side). The above-described components are formed on an end face of a slider substrate composed of a sintered body (altic) containing alumina and titanium carbide using a thin film coating technology.

The magnetic recording element 93 is composed of an inductive element in which a magnetic field is generated according to a current flowing on a coil. Also, the magnetic head slider 9 includes a magnetic reproducing element (not illustrated) composed of a magneto-resistance effect element. The above-described elements are electrically connected by wiring lines (not illustrated) to a plurality of terminals 91 formed on an end face 9e of the front side (air outflow side) of the magnetic head slider 9.

The photoelectric converter 95 is formed through the magnetic head slider 9 in the vertical direction. This photoelectric converter 95 receives laser light emitted by the laser diode 7 from a receiving surface 95f (refer to FIG. 5A) formed on an upper surface 9f of the magnetic head slider 9, and produces near-field light generated by this laser light from an end face 95d formed on the recording medium-facing surface 9d of the magnetic head slider 9. This photoelectric converter 95 is preferably formed near the magnetic recording element 93.

Specifically, a near-field optical element 952 is formed on a lower end of the photoelectric converter 95, and a waveguide 951 which leads laser light from the receiving surface 95f up to the photoelectric converter 95 is formed on an upper side of the near-field optical element 952. When plasmon resonance is excited by laser light, the near-field optical element 952 produces near-field light. On the other hand, the waveguide 951 is composed of a material having translucency with respect to laser light, such as quarts. In addition, the photoelectric converter 95 is not limited to the above-described example, but may have a so-called probe shape in which a cross-sectional area of the waveguide is narrowed down toward the lower end.

The sub-mount 8A is composed of a material having thermal conductivity more than that of the laser diode 7 and a coefficient of thermal expansion near to that of the laser diode 7, such as silicon and aluminium nitride. As illustrated in FIG. 4A, a concave portion 82A opened to the upper surface 8f side, for storing the laser diode 7 is formed in this sub-mount 8A. This concave portion 82A is formed in a flat cuboid shape which is relatively short in the vertical direction. Further, a through-hole 84, which is penetrated up to the lower surface 8d side, having a rectangular cross section shape spread in the width direction is formed in the front part of the bottom part of this concave portion 82A. As illustrated in FIG. 5A, this through-hole 84 has a shape spreading toward the lower surface 8d side, and is formed at a position corresponding to the receiving surface 95f of the photoelectric converter 95 included in the magnetic head slider 9.

The laser diode 7 has a rectangular-plate shape, and is stored in the concave portion 82A so as to be approximately parallel to the bottom part of the concave portion 82A of the sub-mount 8A. This laser diode 7 is arranged such that the front part covers the through-hole 84. As illustrated in FIG. 5A, the laser diode 7 has a p-n junction surface 71 in a lower portion, and a longitudinal direction of this p-n junction surface 71 is set to a direction of a resonator. Accordingly, the resonator direction of the laser diode 7 is approximately parallel to the bottom part of the concave portion 82A.

Further, a notch 721 obliquely spreading from the lower surface to a backward side is formed in the front part covering an upper surface of the through-hole 84 of the laser diode 7. Laser light generated by the laser diode 7 is totally reflected by an inclined plane 722 constituting this notch 721 and is produced downward perpendicularly to the resonator direction. Accordingly, an angle part having this inclined plane 722 is defined as an output end 72a of laser light. The laser light produced downward from this output end 72a passes through the through-hole 84 and enters the receiving surface 95f of the photoelectric converter 95.

Further, the laser diode 7 is not limited to the above-described example. For example, as illustrated in FIG. 5B, at least a lower portion of an end face on the front side of the laser diode 7 may be made to have the inclined surface 722.

As can be seen from the above sequence, laser light produced downward from the laser diode 7 stored in the concave portion 82A of the sub-mount 8A passes through the through-hole 84 and enters the receiving surface 95f of the photoelectric converter 95 included in the magnetic head slider 9. This makes it possible to cut down a propagation distance of laser light from the output end 72a of the laser diode 7 up to the receiving surface 95f of the photoelectric converter 95, thereby reducing a coupling loss of the laser light.

Next, as illustrated in FIG. 4B, a plurality of wiring lines 81 are arranged on the front part of the lower surface 8d of the sub-mount 8A from the proximity of the through-hole 84 up to the slightly downward end face 8e on the front side. As illustrated in FIGS. 2 and 3, the above-described wiring lines 81 electrically connect a plurality of terminals 91 arranged on the magnetic head slider 9 and a plurality of terminals 411 arranged on the HGA 41, respectively. Specifically, an end on the front side of each wiring line 81 spreads up to an end face 8e on the front side of the sub-mount 8A, and is connected via solder etc. to each terminal 411 arranged on the HGA 41. On the other hand, an end on the backward side of each wiring line 81 spreads up to a position corresponding to the end face 9e on the front side of the magnetic head slider 9, and is connected via solder etc. to each terminal 91 arranged on this end face 9e.

When such configuration is adopted, even if the terminal 91 arranged on the magnetic head slider 9 and the terminal 411 arranged on the HGA 41 are separated from each other, these terminals can be electrically connected to each other via the wiring line 81 formed on the sub-mount 8A. Further, as illustrated in FIG. 3, since each end of the wiring line 81 is formed so as to have a predetermined angle smaller than 180 degrees with respect to the terminals 91 and 411 to be connected, the wiring line 81 easily connects the terminals 91 and 411 via solder etc.

Next, as illustrated in FIG. 4A, a pad wiring line (a first wiring line) 85 spread on the bottom part is formed in the concave portion 82A of the sub-mount 8A. As illustrated in FIG. 5A, this wiring line 85 is connected to a terminal 75 arranged on the lower surface of the laser diode 7 stored in the concave portion 82A. In addition, alignment marks 86 used at the time of mounting the laser diode 7 are also formed on the bottom part of the concave portion 82A.

On the other hand, as illustrated in FIG. 4B, a wiring line (a second wiring line) 83 from the through-hole 84 up to the end face 8e on the front side is formed on the front part of the lower surface 8d of the sub-mount 8A. After spreading outward in a width direction from the through-hole 84, this wiring line 83 is bent forward and routed up to the end face 8e, and is connected via solder to the terminal 411 arranged on the HGA 41.

As illustrated in FIGS. 4B and 5A, these wiring lines 83 and 85 are connected via a wiring line within the through-hole 841 formed on a sidewall of the through-hole 84. This processing permits the terminal 75 arranged on the laser diode 7 to be electrically connected to the terminal 411 arranged on the HGA 41. Further, the terminal 76 arranged on an upper surface of the laser diode 7 is grounded to the flexure 413 via a junction 413g made of conductive adhesive.

When the thermally assisted magnetic recording head 10A is configured as described above, the need to route a wiring line for being connected to the laser diode 7 between the flexure 413 and the sub-mount 8A is eliminated, and therefore, a movement of the thermally assisted magnetic recording head 10A is not disturbed by the above-described wiring line. Further, the wiring line 83 electrically connected to the terminal 75 of the laser diode 7 is formed on the lower surface 8d of the sub-mount 8A, and therefore can be connected to the terminal 411 arranged on the HGA 41 in the same manner as in the above-described wiring line 81.

Next, as illustrated in FIG. 4B, a convex portion 88 formed in the same thickness as that of the wiring lines 81 and 83 using the same metal material as that of the wiring lines 81 and 83 is provided on the lower surface 8d of the sub-mount 8A. This convex portion 88 is formed so as to surround an approximately central part of the region corresponding to the magnetic head slider 9. When the magnetic head slider 9 is bonded to the lower surface 8d of the sub-mount 8A, an adhesive is applied to an internal region surrounded by this convex portion 88. As illustrated in FIG. 5A, the upper surface 9f of the magnetic head slider 9 is bonded to the lower surface 8d of the sub-mount 8A with a part of the upper surface 9f contacting a top face of the convex portion 88.

As can be seen from the above sequence, when the convex portion 88 is arranged between the lower surface 8d of the sub-mount 8A and the upper surface 9f of the magnetic head slider 9, the magnetic head slider 9 can be prevented from being transformed due to thermal expansion of the sub-mount 8A. Further, the convex portion 88 is formed so as to surround an approximately central part of the region corresponding to the magnetic head slider 9, and therefore, can prevent the magnetic head slider 9 from being bonded to the sub-mount 8A in a tilted position.

Hereinafter, a modification example of the thermally assisted magnetic recording head 10A according to the first embodiment will be described. Note that in figures, the same circuit elements as those in the first embodiment are indicated by the same reference numerals as in the first embodiment, and a detailed description will not be repeated here.

Figure 6B:
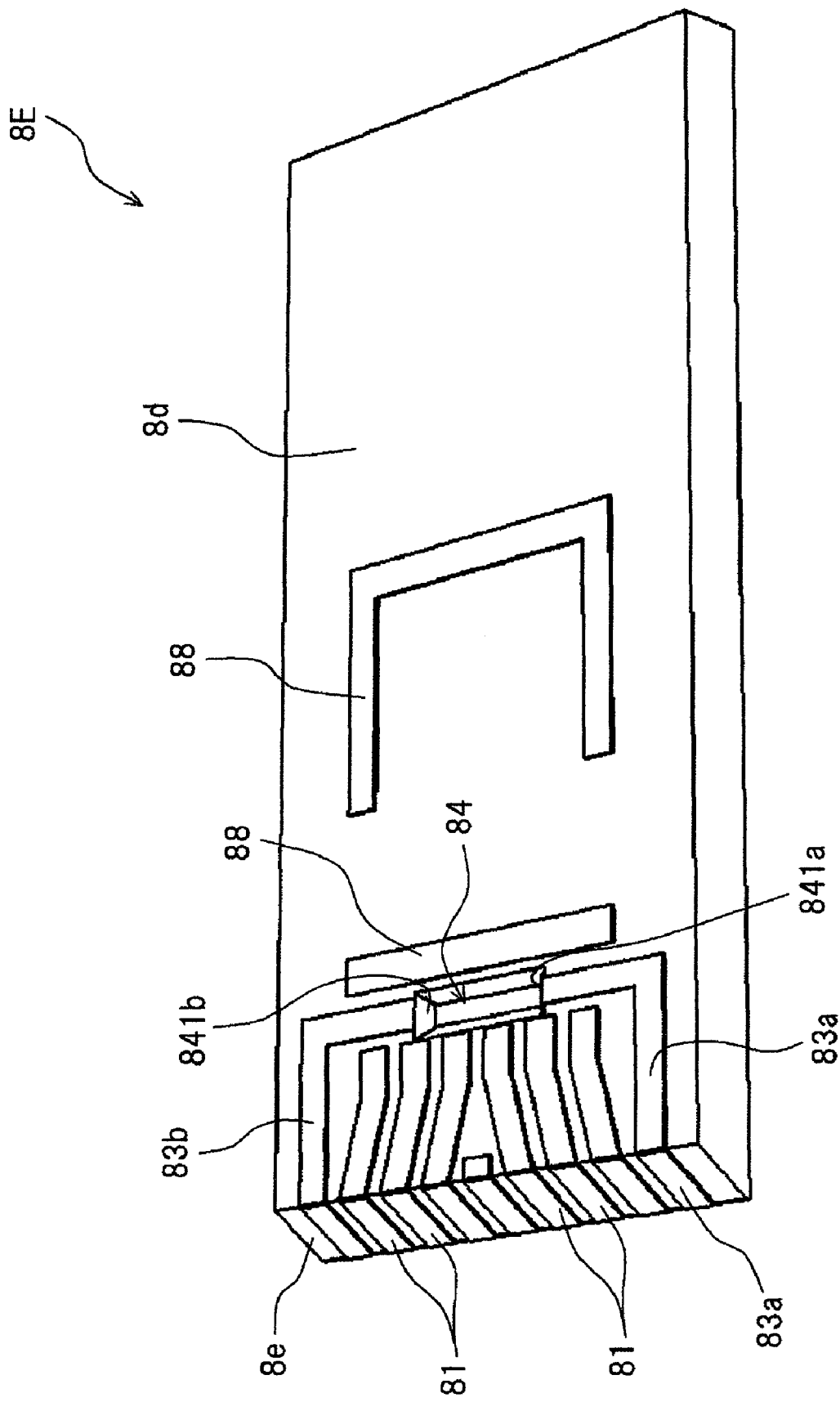
FIG. 6B is a perspective view illustrating a lower surface side of the sub-mount included in the thermally assisted magnetic recording head according to the modification example of the first embodiment.
Figure 7:
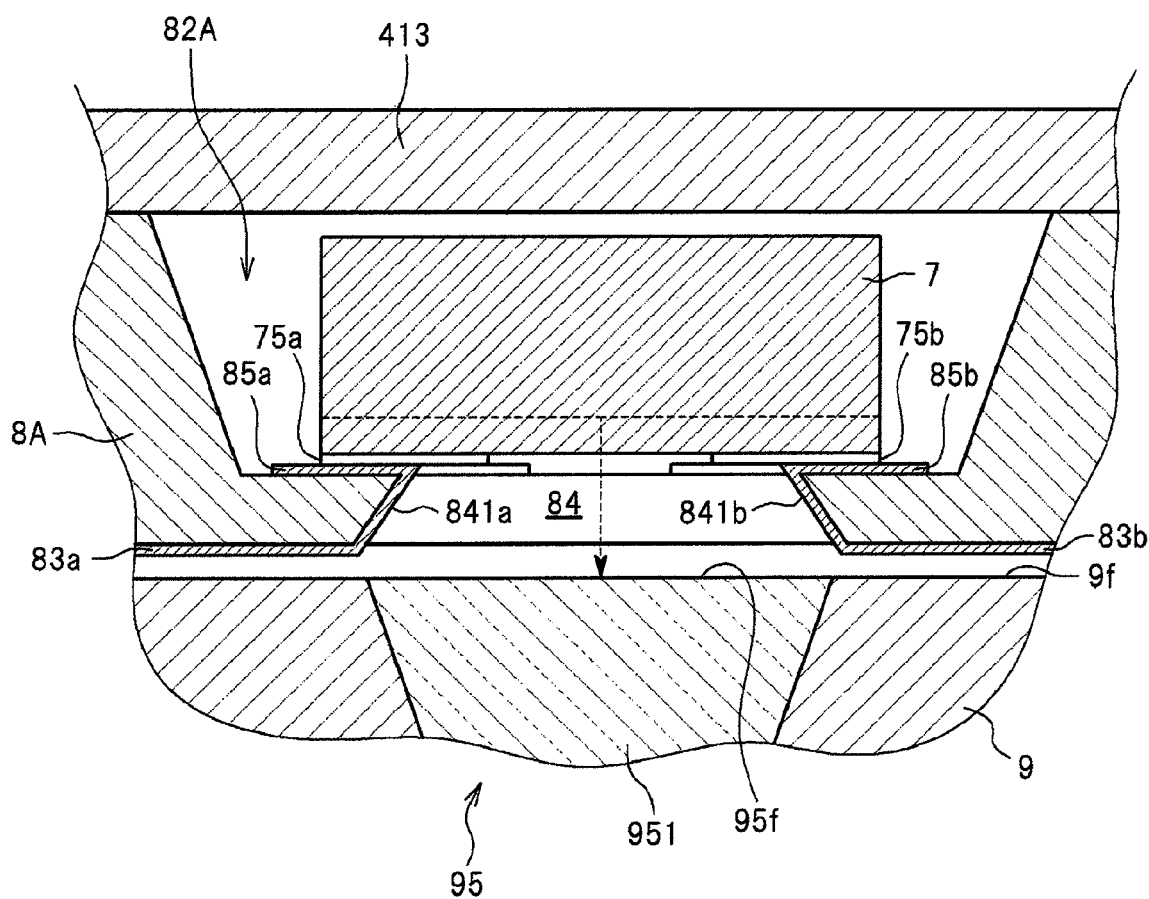
FIG. 7 is an enlarged cross-sectional view illustrating the thermally assisted magnetic recording head according to the modification example of the first embodiment.

FIGS. 6A and 6B are perspective views illustrating an upper surface side and lower surface side of a sub-mount 8E according to the modification example. FIG. 7 is an enlarged cross-sectional view according to the above-described modification example. In FIG. 7 described above, there is schematically illustrated an essential part of a cross-sectional surface at the time of cutting down the sub-mount 8E in a width direction through the through-hole 84.

According to this modification example, as illustrated in FIG. 6k two pad wiring lines (first wiring lines) 85a and 85b spreading in a longitudinal direction and arrayed in a width direction are formed on a bottom part of the concave portion 82A of the sub-mount 8E. As illustrated in FIG. 7, the above-described wiring lines 85a and 85b are connected to two terminals 75a and 75b arranged on a lower surface of the laser diode 7 stored in the concave portion 82k respectively.

On the other hand, as illustrated in FIG. 6B, two wiring lines (second wiring lines) 83a and 83b from the through-hole 84 up to the end face 8e on the front side are formed on the front part of the lower surface 8d of the sub-mount 8E. After spreading outward, respectively, from both sides in a width direction of the through-hole 84, these wiring lines 83a and 83b are bent forward and routed up to the end face 8e, and are connected via solder etc. to the terminal 411 arranged on the HGA 41.

As illustrated in FIG. 7, these wiring lines 83a and 83b, and 85a and 85b are connected through wiring lines within the through-hole 841*a* and 841*b* formed on both sides in a width direction on a sidewall of the through-hole 84, respectively. This processing permits the terminals 75*a* and 75*b* arranged on a lower surface of the laser diode 7 to be electrically connected to the terminal 411 arranged on the HGA 41.

When the thermally assisted magnetic recording head 10A is configured as described above, the need to route a wiring line for being connected to the laser diode 7 between the flexure 413 and the sub-mount 8E is eliminated. Therefore, a movement of the thermally assisted magnetic recording head 10A is not disturbed by the above-described wiring line. Further, since the wiring lines 85*a* and 85*b* electrically connected to the terminals 75*a* and 75*b* of the laser diode 7 are formed on the lower surface 8*d* of the sub-mount 8E, these wiring lines 85*a* and 85*b* can be connected to the terminal 411 arranged on the HGA 41 in the same manner as in the above-described wiring line 81.

Figure 8:
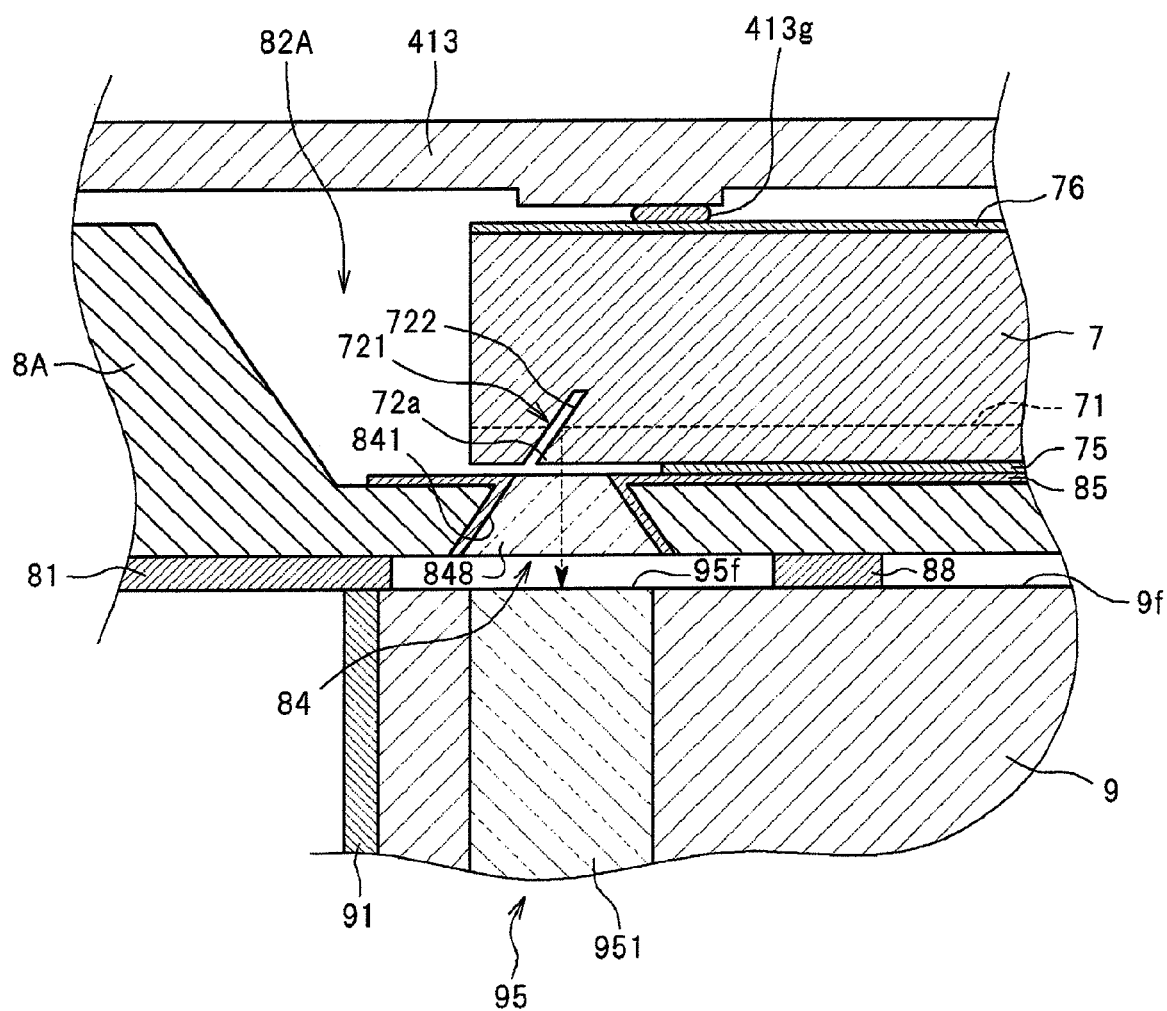
FIG. 8 is an enlarged cross-sectional view illustrating the thermally assisted magnetic recording head according to the modification example of the first embodiment.

FIG. 8 is an enlarged cross-sectional view according to another modification example. As in this modification example, a waveguide member 848 having translucency with respect to laser light emitted by the laser diode 7, such as quarts may be filled in the through-hole 84 of the sub-mount 8A. According to this modification example, a coupling loss of laser light can be further reduced.

Figure 9:
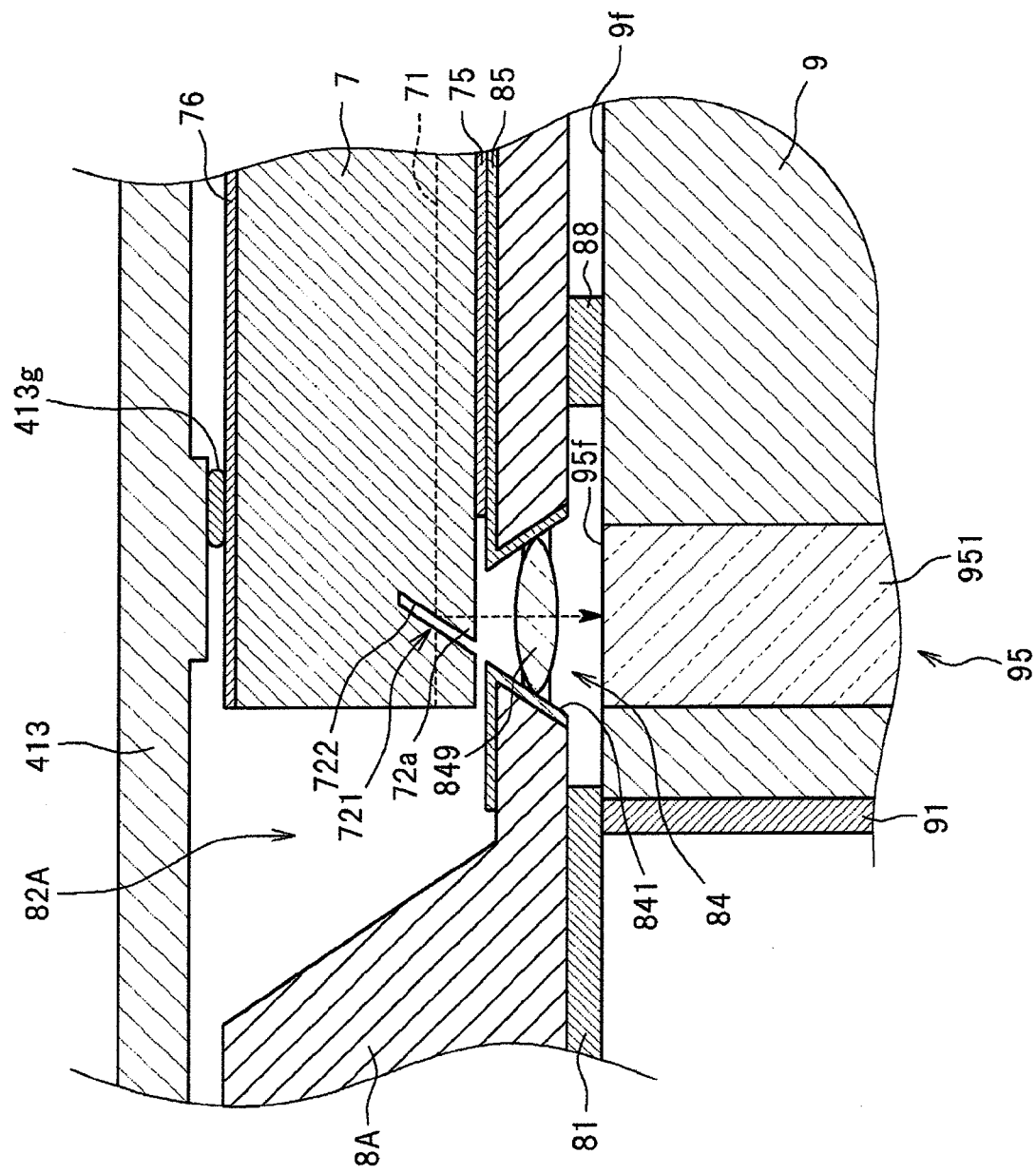
FIG. 9 is an enlarged cross-sectional view illustrating the thermally assisted magnetic recording head according to the modification example of the first embodiment.

FIG. 9 is an enlarged cross-sectional view according to yet another modification example. As in this modification example, a lens 849 which condenses laser light emitted by the laser diode 7 toward the receiving surface 95*f* of the photoelectric converter 95 may be provided in the through-hole 84 of the sub-mount 8A. According to this modification example, a coupling loss of laser light can be further reduced.

(Second Embodiment of Thermally Assisted Magnetic Recording Head)

Hereinafter, a second embodiment (defined as a thermally assisted magnetic recording head 10B) of the thermally assisted magnetic recording head 10 according to one embodiment of the present invention will be described. Note that in figures, the same circuit elements as those in the first embodiment are indicated by the same reference numerals as in the first embodiment, and a detailed description will not be repeated here.

Figure 10:
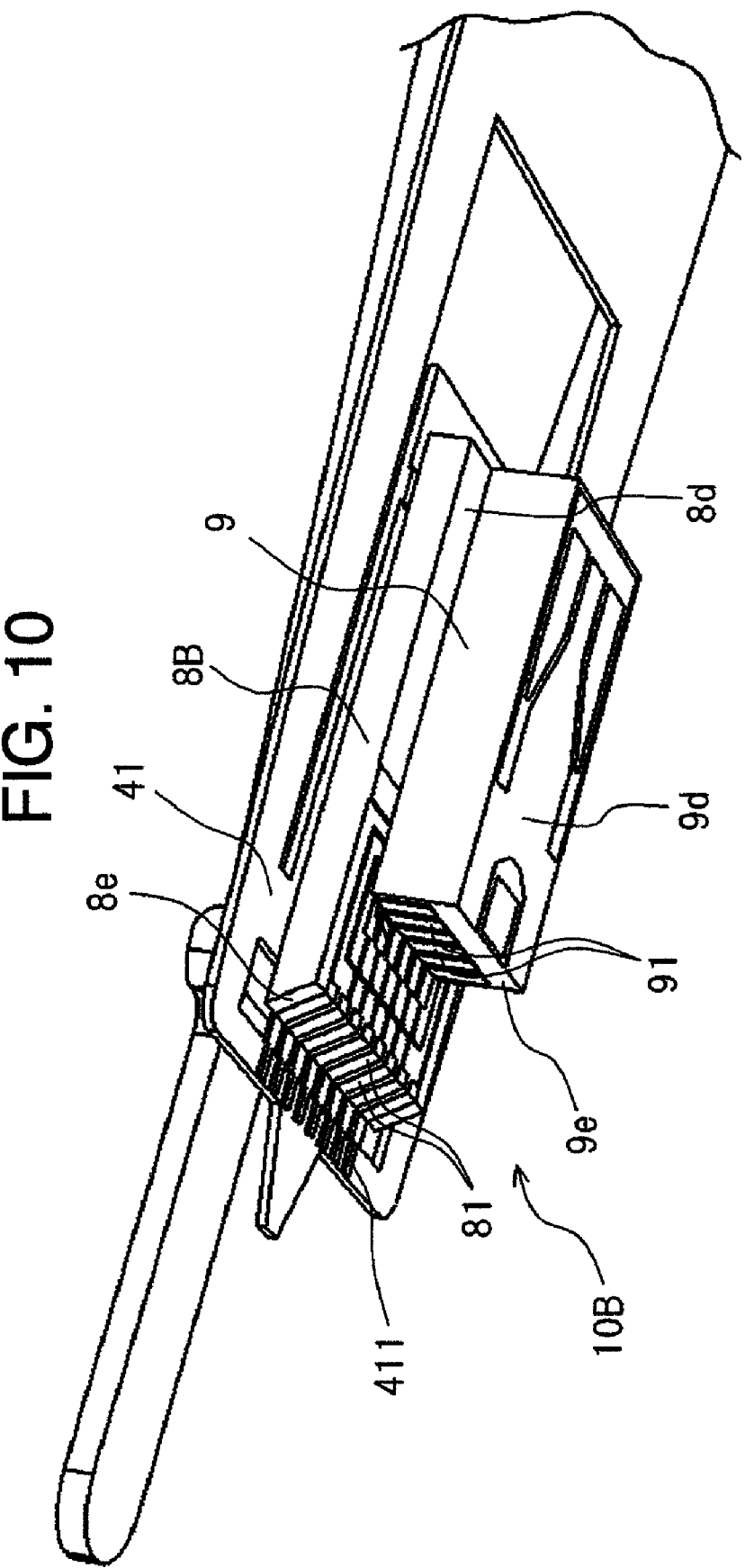
FIG. 10 is a perspective view illustrating a thermally assisted magnetic recording head (second embodiment) according to one embodiment of the present invention.
Figure 11:
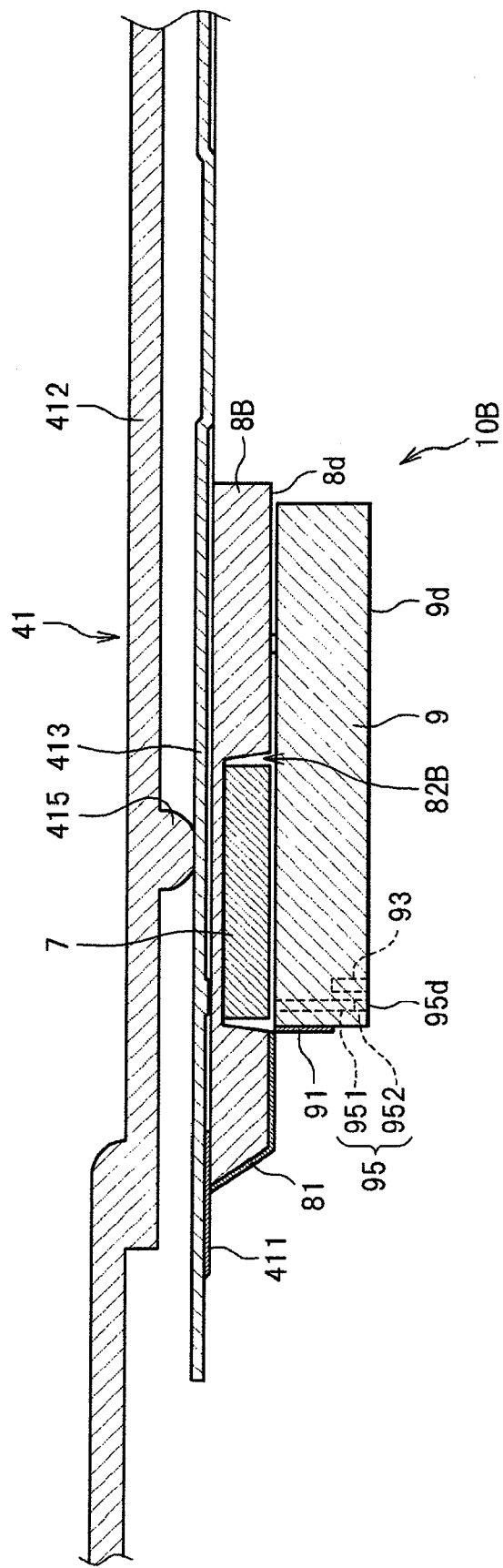
FIG. 11 is a cross-sectional view illustrating the thermally assisted magnetic recording head according to the second embodiment.
Figure 12:
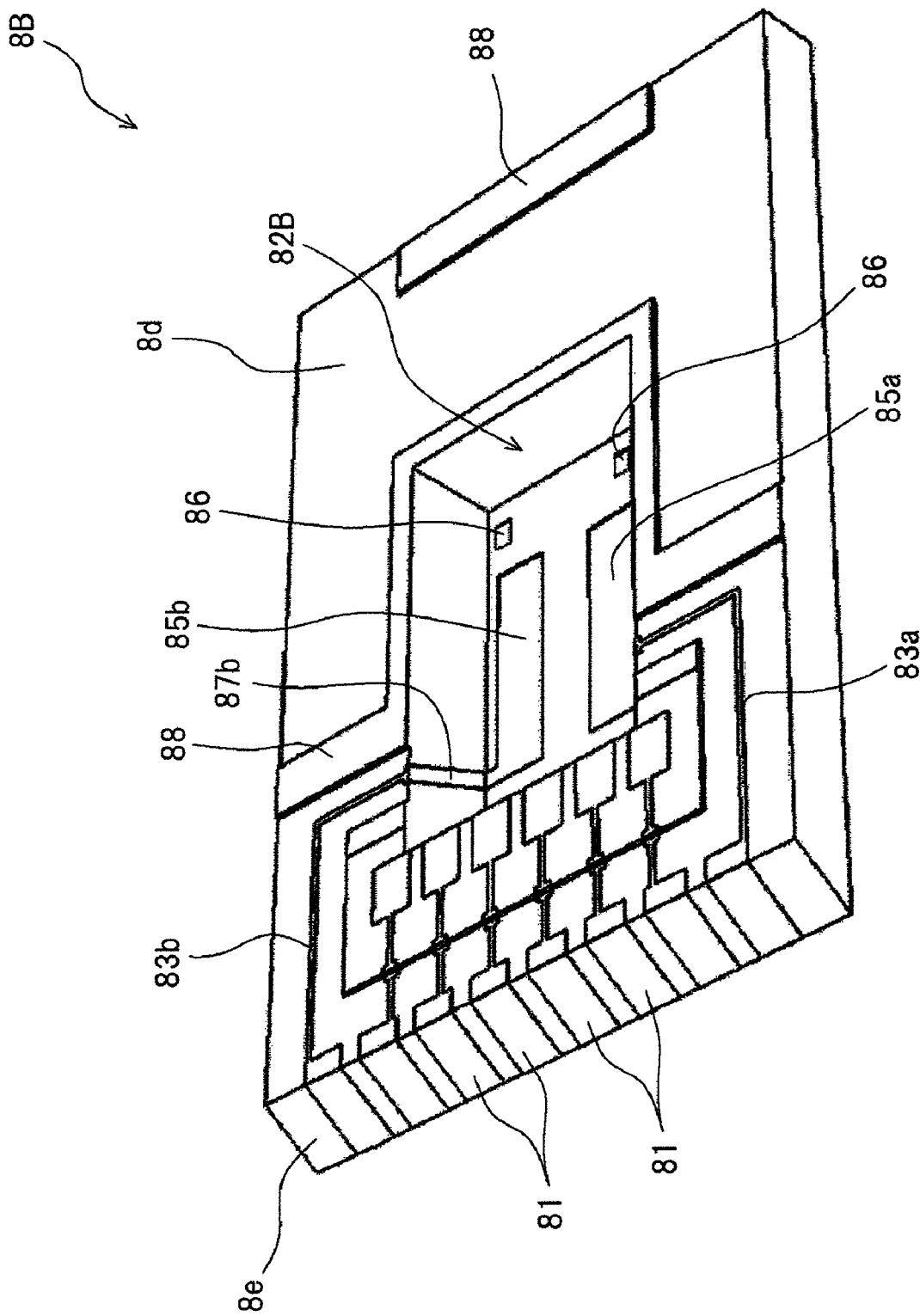
FIG. 12 is a perspective view illustrating a lower surface side of the sub-mount included in the thermally assisted magnetic recording head according to the second embodiment.
Figure 13:
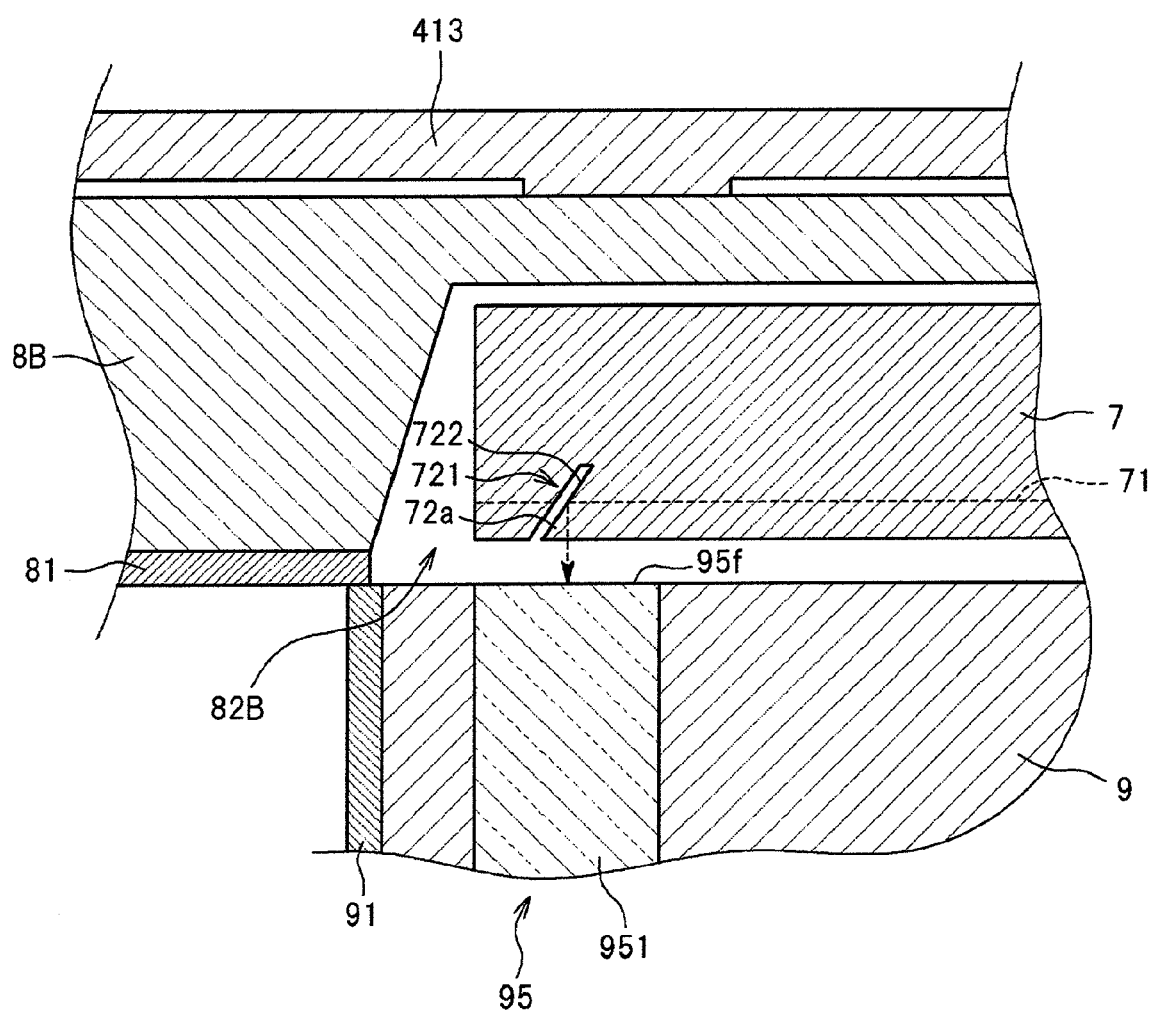
FIG. 13 is an enlarged cross-sectional view of the thermally assisted magnetic recording head according to the second embodiment.
Figure 14:
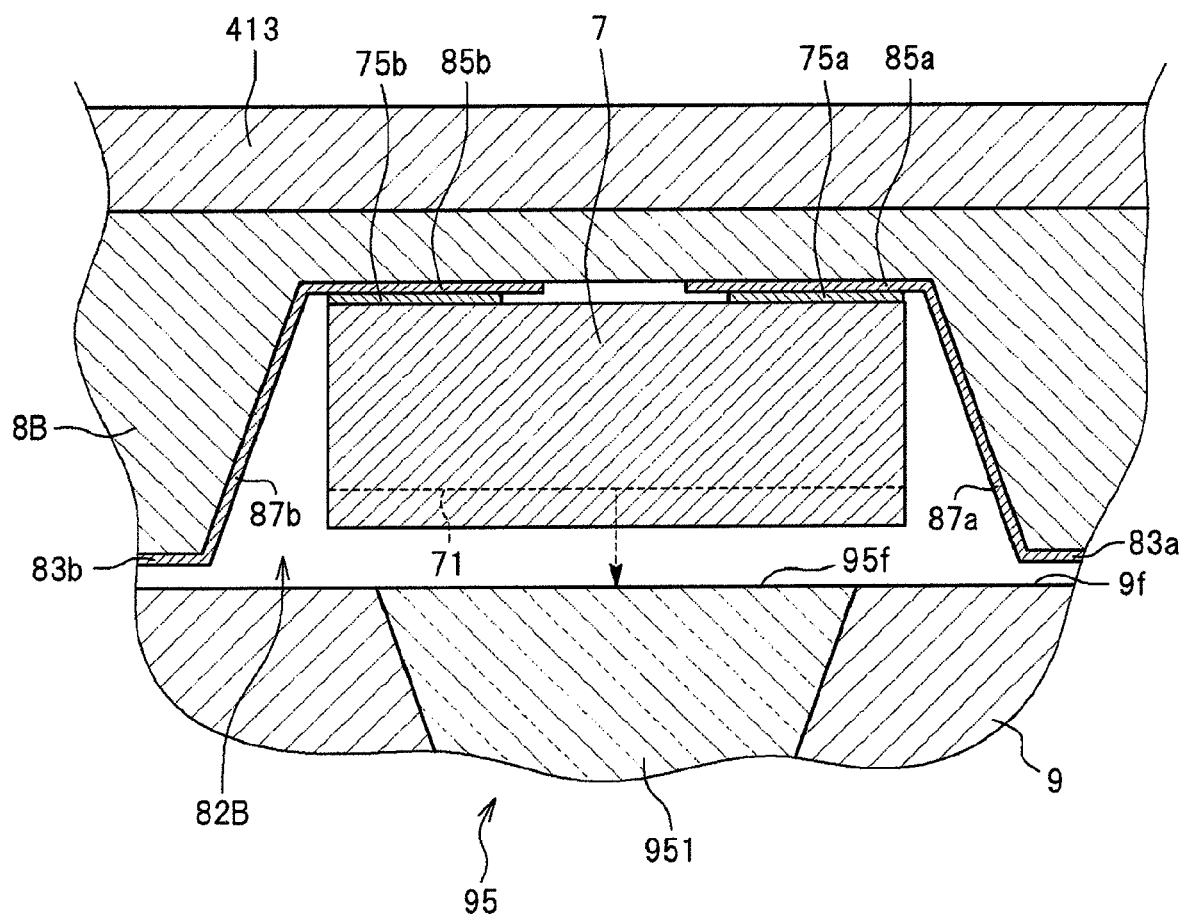
FIG. 14 is an enlarged cross-sectional view of the thermally assisted magnetic recording head according to the second embodiment.

FIGS. 10 and 11 are a perspective view and cross sectional view of the thermally assisted magnetic recording head 10B. In FIG. 11 described above, there is schematically illustrated a cross-sectional surface at the time of cutting down the thermally assisted magnetic recording head 10B at a central part in a width direction. FIG. 12 is a perspective view illustrating a lower surface side of a sub-mount 8B included in the thermally assisted magnetic recording head 10B. FIG. 13 is an enlarged view of an essential part of FIG. 11 described above. FIG. 14 is a cross-sectional view illustrating the thermally assisted magnetic recording head 10B. In FIG. 14 described above, there is schematically illustrated an essential part of a cross-sectional surface at the time of cutting down the thermally assisted magnetic recording head 10B along a width direction.

As illustrated in FIG. 12, a concave portion 82B opened to the lower surface 8*d* side, for storing the laser diode 7 is formed in the sub-mount 8B. As illustrated in FIG. 13, the laser diode 7 is stored in the concave portion 82B of the sub-mount 8B so as to be approximately parallel to the bottom part of the concave portion 82B. In the front part covering the receiving surface 95*f* of the photoelectric converter 95 included in the magnetic head slider 9, this laser diode 7 has an output end 72*a* for producing laser light downward perpendicularly to the resonator direction. Laser light produced downward from this output end 72*a* enters the receiving surface 95*f* of the photoelectric converter 95.

As can be seen from the above sequence, laser light produced downward from the laser diode 7 stored in the concave portion 82B of the sub-mount 8B enters the receiving surface 95*f* of the photoelectric converter 95 included in the magnetic head slider 9. This makes it possible to cut down a propagation distance of laser light from the laser diode 7 up to the receiving surface 95*f* of the photoelectric converter 95, thereby reducing a coupling loss of the laser light.

Next, as illustrated in FIG. 12, two pad wiring lines (first wiring lines) 85*a* and 85*b* spreading in the longitudinal direction and arrayed in the width direction are formed on a bottom part of the concave portion 82B of the sub-mount 8B. As illustrated in FIG. 14, these wiring lines 85*a* and 85*b* are connected to two terminals 75*a* and 75*b* arranged on an upper surface of the laser diode 7 stored in the concave portion 82B, respectively.

Further, two wiring lines (second wiring lines) 83*a* and 83*b* from the concave portion 82B up to the end face 8*e* on the front side are formed on the front part of the lower surface 8*d* of the sub-mount 8B. After spreading outward respectively from both sides in the width direction of the concave portion 82B, these wiring lines 83*a* and 83*b* are bent forward and routed up to the end face 8*e*, and are connected via solder etc. to the terminal 411 arranged on the HGA 41.

As illustrated in FIGS. 12 and 14, these wiring lines 83*a* and 83*b*, and 85*a* and 85*b* are connected via sidewall wiring lines 87*a* and 87*b* formed on a side part of the concave portion 82A, respectively. This processing permits the terminals 75*a* and 75*b* arranged on an upper surface of the laser diode 7 to be electrically connected to the terminal 411 arranged on the HGA 41.

As can be seen from the above sequence, the wiring lines 83*a* and 83*b* electrically connected to the terminals 75*a* and 75*b* arranged on the laser diode 7 are formed on the lower surface 8*d* of the sub-mount 8E. This processing permits these wiring lines 85*a* and 85*b* to be connected to the terminal 411 arranged on the HGA 41 in the same manner as in the above-described wiring line 81.

(Third Embodiment of Thermally Assisted Magnetic Recording Head)

Hereinafter, a third embodiment (defined as a thermally assisted magnetic recording head 10C) of the thermally assisted magnetic recording head 10 according to one embodiment of the present invention will be described. Note that in figures, the same circuit elements as those in the first embodiment are indicated by the same reference numerals as in the first embodiment, and a detailed description will not be repeated here.

Figure 15:
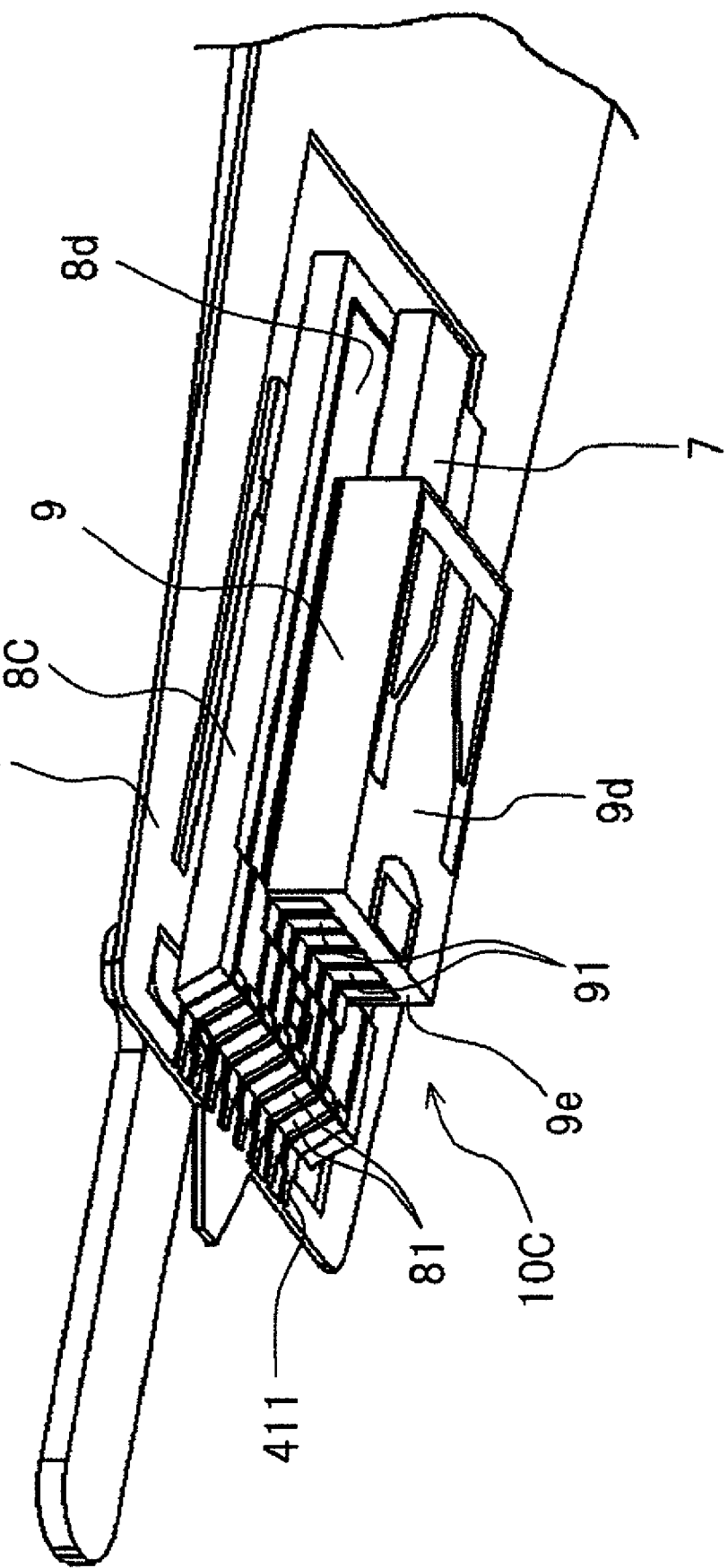
FIG. 15 is a perspective view illustrating a thermally assisted magnetic recording head (third embodiment) according to one embodiment of the present invention.
Figure 16:
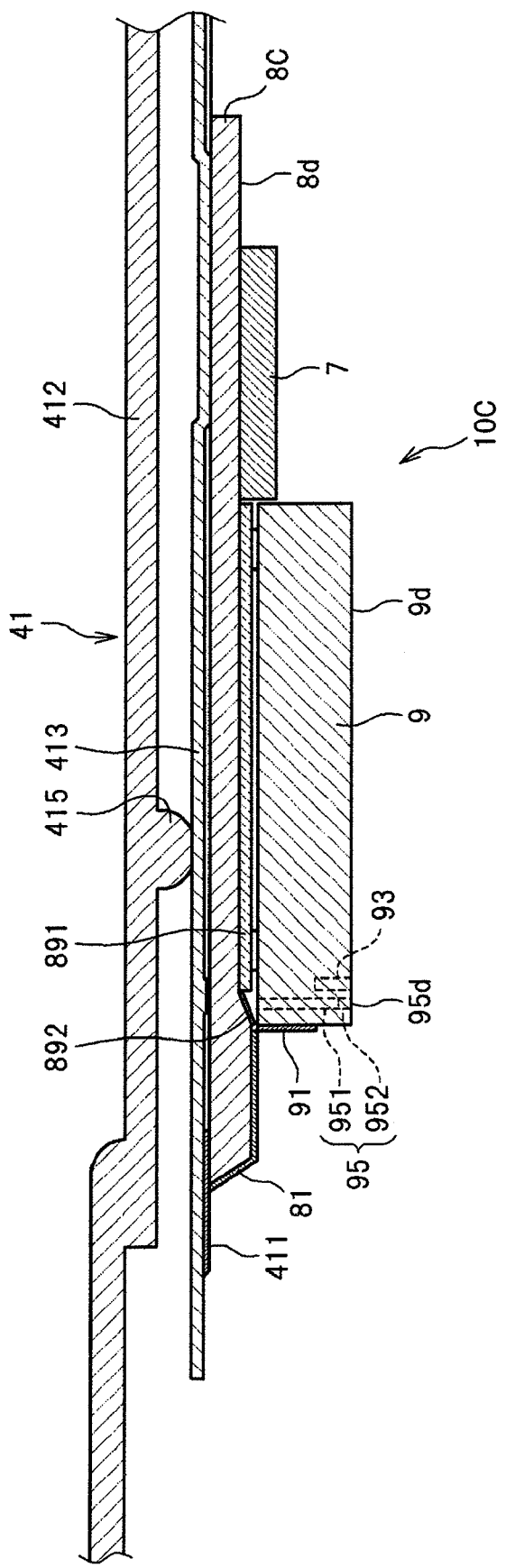
FIG. 16 is a cross-sectional view illustrating the thermally assisted magnetic recording head according to the third embodiment.
Figure 17:
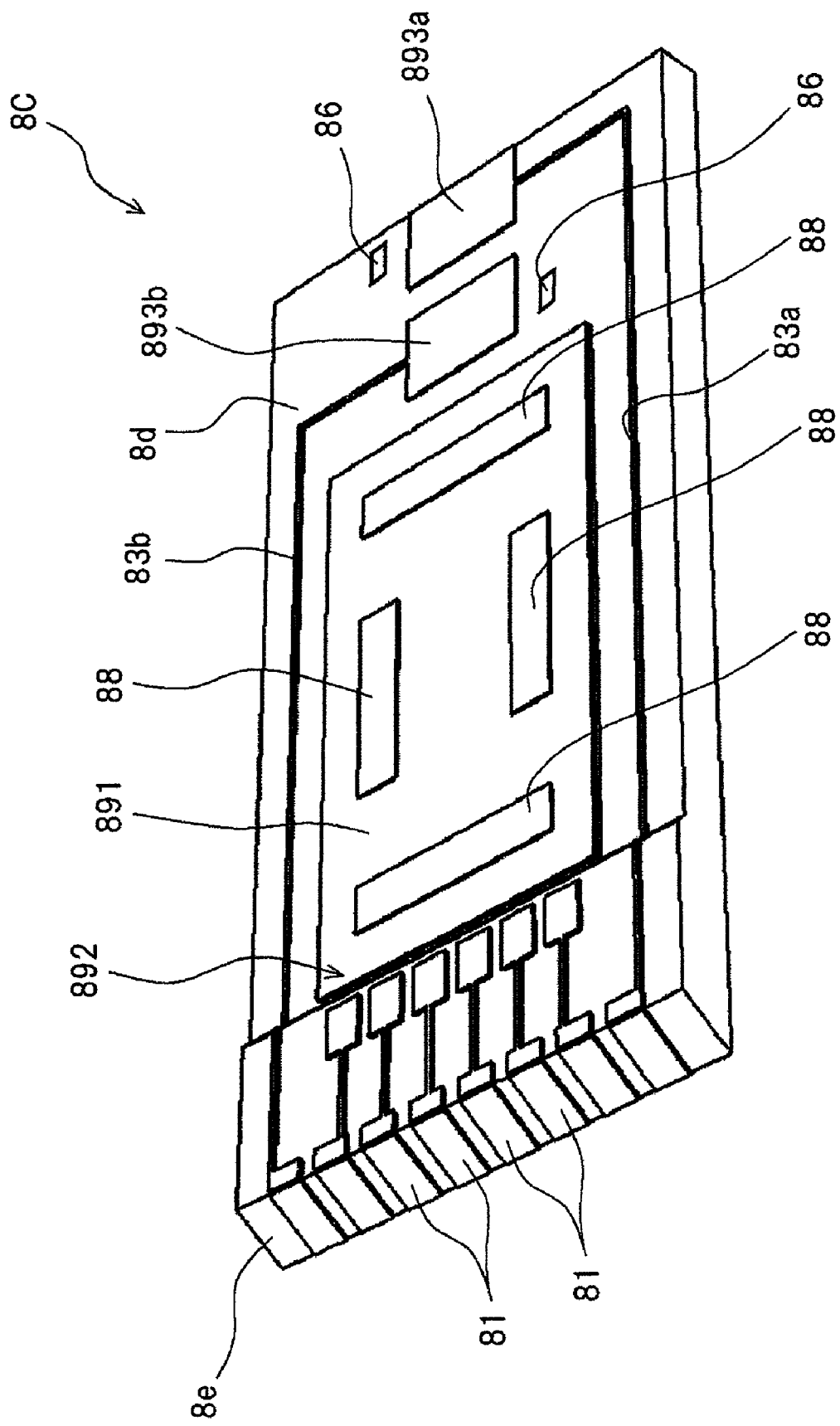
FIG. 17 is a perspective view illustrating a lower surface side of the sub-mount included in the thermally assisted magnetic recording head according to the third embodiment.
Figure 18:
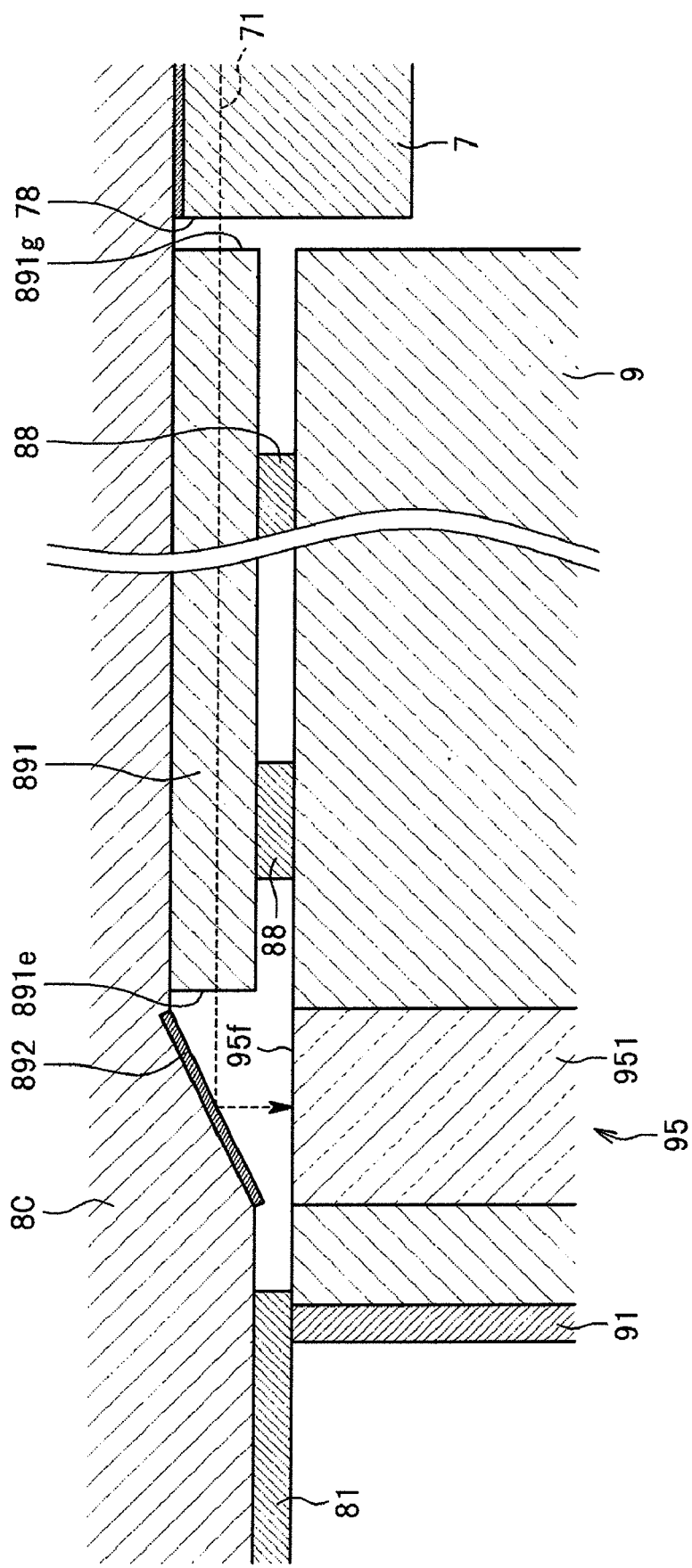
FIG. 18 is an enlarged cross-sectional view of the thermally assisted magnetic recording head according to the third embodiment.

FIGS. 15 and 16 are a perspective view and cross sectional view of the thermally assisted magnetic recording head 10C. In FIG. 16 described above, there is schematically illustrated a cross-sectional surface at the time of cutting down the thermally assisted magnetic recording head 10C at a central part in a width direction. FIG. 17 is a perspective view illustrating a lower surface side of a sub-mount 8C included in the thermally assisted magnetic recording head 10C. FIG. 18 is an enlarged view of an essential part of FIG. 16 described above.

As illustrated in FIGS. 16 and 17, a pedestal 891 for mounting the magnetic head slider 9 on itself is provided on the lower surface 8*d* of the sub-mount 8C so as to overhang below the lower surface 8*d*. This pedestal 891 is composed of a waveguide member having translucency with respect to laser light emitted by the laser diode 7, such as quartz. On the other hand, on the lower surface 8*d* of the sub-mount 8C, a mirror 892 facing to a backward side and a downward side is formed on the side anterior to the pedestal 891. As illustrated in FIG. 18, this mirror 892 is formed so as to cover the receiving surface 95f of the photoelectric converter 95 included in the magnetic head slider 9. That is, the magnetic head slider 9 is mounted on the pedestal 891 so as to form a gap between the receiving surface 95f of the photoelectric converter 95 and the lower surface 8d of the sub-mount 8C. On the other hand, the mirror 892 is formed between the receiving surface 95f of the photoelectric converter 95 and the lower surface 8d of the sub-mount 8C.

The laser diode 7 is mounted on the side posterior to the pedestal 891 on the lower surface 8d of the sub-mount 8C, and is arranged along with the magnetic head slider 9 in the longitudinal direction. As illustrated in FIG. 18, this laser diode 7 has a p-n junction surface 71 on the side near the lower surface 8d of the sub-mount 8C, and the longitudinal direction of this p-n junction surface 71 is set to a direction of the resonator. Further, an end face 78 on the front side of the laser diode 7 is set to a cleavage surface, and laser light is produced from this end face 78 to the front side. The produced laser light enters an end face 891g on the backward side of the pedestal 891 and passes through the pedestal 891. Then, the laser light is emitted from an end face 891e on the front side of the pedestal 891 and reaches the mirror 892. Further, the laser light is turned over to the lower side by the mirror 892 and enters the receiving surface 95f of the photoelectric converter 95 included in the magnetic head slider 9.

As can be seen from the above sequence, as compared with a case where the laser diode 7 is disposed over the magnetic head slider 9 as in the above-described first and second embodiments, when the magnetic head slider 9 is disposed along with the laser diode 7 in the longitudinal direction, a thickness of the sub-mount 8C in the vertical direction can be reduced. Therefore, when the thermally assisted magnetic recording head 10C mounted on the flexure 413 of the HGA 41 tilts at the center of the dimple 415 (refer to FIG. 16), a displacement of recorders (the magnetic recording element 93 and the near-field optical element 952) provided on a lower end with respect to a target position in the magnetic disk 3 can be reduced as compared with the case of the above-described first and second embodiments.

Next, as illustrated in FIG. 17, two pad wiring lines 893a and 893b arrayed in the longitudinal direction are formed on the side posterior to the pedestal 891 on the lower surface 8d of the sub-mount 8C. These wiring lines 893a and 893b are connected to two terminals (not illustrated) arranged on an upper surface of the laser diode 7, respectively. Further, two wiring lines 83a and 83b from these wiring lines 893a and 893b up to the end face 8e on the front side are formed on the lower surface 8d of the sub-mount 8C. After spreading outward in the width direction respectively from the wiring lines 893a and 893b, these wiring lines 83a and 83b are bent forward and routed up to an end face 8e to be connected via solder etc. to the terminal 411 arranged on the HGA 41. This processing permits two terminals (not illustrated) arranged on the upper surface of the laser diode 7 to be electrically connected to the terminal 411 arranged on the HGA 41.

As can be seen from the above sequence, the wiring lines 83a and 83b electrically connected to the two terminals (not illustrated) arranged on the laser diode 7 are formed on the lower surface 8d of the sub-mount 8E. This processing permits these wiring lines 85a and 85b to be connected to the terminal 411 arranged on the HGA 41 in the same manner as in the above-described wiring line 81.

In addition, according to the above described thermally assisted magnetic recording heads 10A to 10C of the first to third embodiments, the laser diode 7 is mounted on the sub-mounts 8A to 8C, respectively, and heat generated by the laser diode 7 can be dispersed by the sub-mounts 8A to 8C, respectively, thereby suppressing deformation of the magnetic head slider 9. In addition, since thermal expansion of the laser diode 7 can be absorbed in the sub-mounts 8A to 8C, respectively, the deformation of the magnetic head slider 9 can be suppressed.

In addition, according to the proposed thermally assisted magnetic recording heads 10A to 10C of the first to third embodiments, a characteristic evaluation of the laser diode 7 can be performed at a stage where the laser diode 7 is mounted on the sub-mounts 8A to 8C, respectively in a process of manufacture. Therefore, the characteristic evaluations of the sub-mounts 8A to 8C having mounted thereon the laser diode 7 as well as that of the magnetic head slider 9 can be individually performed. As a result, reduction in the yield of the whole thermally assisted magnetic recording heads 10A to 10C in which the above-described components are assembled can be suppressed.

While the invention has been described in detail and with reference to specific embodiments thereof, it will be apparent to one skilled in the art that various changes and modifications can be made therein without departing from the spirit and scope thereof.

Reference Signs List
1: Magnetic disk device
2: Chassis
3: Magnetic disk (one example of recording medium)
4: Head assembly
41: HGA
411: Terminal
412: Load beam
413: Flexure
415: Dimple
5: Spindle motor
6: Voice coil motor
7: Laser diode (one example of light emitting element)
71: P-N junction surface
72a: Output end
721: Notch
722: Inclined surface
75: Terminal
76: Terminal
8A to 8C, 8E: Sub-mounts
81: Wiring line
82A, 82B: Concave portions
83: Wiring line (second wiring line)
84: Through-hole
841: Wiring line within the through-hole
848: Waveguide member
849: Lens
85: Wiring line (first wiring line)
86: Alignment mark
87: Sidewall wiring line
88: Convex portion
891: Pedestal
892: Mirror
893: Wiring line
9: Magnetic head slider
9d: Recording medium-facing surface
91: Terminal
93: Magnetic recording element
95: Photoelectric converter
95d: End face
95f: Receiving surface 951: Waveguide
952: Near-field optical element
10 (10A to 10C): Thermally assisted magnetic recording heads

The invention claimed is:

1. A thermally assisted magnetic recording head comprising:
a light emitting element in which an output end for emitting light in a direction bisecting a resonator direction is formed;
a sub-mount on which the light emitting element is mounted and which is mounted on a head supporting member; and
a head slider which includes at least a magnetic recording element and is mounted on the sub-mount, and which receives light emitted by the light emitting element and includes a photoelectric converter emitting near-field light from a recording medium-facing surface facing a recording medium,
wherein the sub-mount has a wiring line which electrically connects a terminal arranged on the head slider and a terminal arranged on the head supporting member;
wherein the sub-mount has a wiring line which electrically connects a terminal arranged on the light emitting element and a terminal arranged on the head supporting member; and
wherein a concave portion which opens to the head supporting member side and in which the light emitting element is stored and a through-hole which penetrates from a bottom part of the concave portion up to the head slider side are formed in the sub-mount.

2. The thermally assisted magnetic recording head according to claim 1,
wherein the light emitting element is a laser diode in which an output end for emitting light in the direction bisecting a resonator direction is formed, and stored in the concave portion such that the resonator direction is approximately parallel to a bottom part of the concave portion to thereby emit light from the output end toward the through-hole.

3. A thermally assisted magnetic recording head, comprising:
a light emitting element;
a sub-mount on which the light emitting element is mounted and which is mounted on a head supporting member; and
a head slider which includes at least a magnetic recording element and is mounted on the sub-mount, and which receives light emitted by the light emitting element and includes a photoelectric converter emitting near-field light from a recording medium-facing surface facing a recording medium;
wherein the sub-mount has a wiring line which electrically connects a terminal arranged on the head slider and a terminal arranged on the head supporting member;
a concave portion which opens to the head supporting member side and in which the light emitting element is stored and a through-hole which penetrates from a bottom part of the concave portion up to the head slider side are formed in the sub-mount;
a first wiring line connected to a terminal arranged on the light emitting element is formed on a bottom part of the concave portion;
a second wiring line connected to a terminal arranged on the head supporting member is formed on a surface of the head slider side of the sub-mount; and
a wiring line within the through-hole one end of which is connected to the first wiring line and the other end of which is connected to the second wiring line is formed on a sidewall of the through-hole.

4. The thermally assisted magnetic recording head according to claim 3, wherein:
a terminal arranged on one main surface of the light emitting element is connected to the first wiring line formed on a bottom part of the concave portion; and
a terminal arranged on the other main surface of the light emitting element is grounded to the head supporting member.

5. A thermally assisted magnetic recording head, comprising:
a light emitting element;
a sub-mount on which the light emitting element is mounted and which is mounted on a head supporting member; and
a head slider which includes at least a magnetic recording element and is mounted on the sub-mount, and which receives light emitted by the light emitting element and includes a photoelectric converter emitting near-field light from a recording medium-facing surface facing a recording medium;
wherein the sub-mount has a wiring line which electrically connects a terminal arranged on the head slider and a terminal arranged on the head supporting member;
a concave portion which opens to the head supporting member side and in which the light emitting element is stored and a through-hole which penetrates from a bottom part of the concave portion up to the head slider side are formed in the sub-mount;
a plurality of first wiring lines connected respectively to a plurality of terminals arranged on one main surface of the light emitting element are formed on a bottom part of the concave portion;
a plurality of second wiring lines connected respectively to a plurality of terminals arranged on the head supporting member are formed on a surface of the head slider side of the sub-mount; and
a plurality of wiring lines within the through-hole one ends of which are connected respectively to the plurality of first wiring lines and the other ends of which are connected respectively to the plurality of second wiring lines are formed on a sidewall of the through-hole.

6. The thermally assisted magnetic recording head according to claim 1,
wherein a waveguide member having translucency with respect to light emitted by the light emitting element is filled in the through-hole.

7. The thermally assisted magnetic recording head according to claim 1,
wherein a lens which condenses light emitted by the light emitting element toward a receiving surface of the photoelectric converter is provided in the through-hole.

8. A thermally assisted magnetic recording head, comprising:
a light emitting element;
a sub-mount on which the light emitting element is mounted and which is mounted on a head supporting member; and
a head slider which includes at least a magnetic recording element and is mounted on the sub-mount, and which receives light emitted by the light emitting element and includes a photoelectric converter emitting near-field light from a recording medium-facing surface facing a recording medium;
wherein the sub-mount has a wiring line which electrically connects a terminal arranged on the head slider and a terminal arranged on the head supporting member;

a concave portion which opens to the head supporting member side and in which the light emitting element is stored and a through-hole which penetrates from a bottom part of the concave portion up to the head slider side are formed in the sub-mount;

light emitted by the light emitting element stored in the concave portion enters a receiving surface of the photoelectric converter, formed on a surface of the sub-mount side of the head slider;

a plurality of first wiring lines connected respectively to a plurality of terminals arranged on one main surface of the light emitting element are formed on a bottom part of the concave portion;

a plurality of second wiring lines connected respectively to a plurality of terminals arranged on the head supporting member are formed on a surface of the head slider side of the sub-mount; and a plurality of sidewall wiring lines one ends of which are connected respectively to the plurality of first wiring lines and the other ends of which are connected respectively to the plurality of second wiring lines are formed on a side part of the concave portion.

9. A thermally assisted magnetic recording head, comprising:

a pedestal;
a sub-mount; and
a head slider;
wherein:
the pedestal is arranged between the sub-mount and the head slider, and the pedestal and a mirror are formed on a facing surface through which the sub-mount faces the head slider;

a light emitting element is mounted on the facing surface so as to emit light toward the mirror;

the pedestal is composed of a waveguide member having translucency with respect to light emitted by the light emitting element; and after passing through the pedestal, light emitted by the light emitting element is turned over by the mirror and enters a receiving surface of the photoelectric converter of the head slider.

10. The thermally assisted magnetic recording head according to claim 1, wherein:

a convex portion is formed on a mounting surface on which the head slider of the sub-mount is mounted; and the head slider is bonded to the mounting surface with a part of the head slider contacting a top face of the convex portion.

11. A head assembly including the thermally assisted magnetic recording head according to claim 1.

12. The thermally assisted magnetic recording head according to claim 9, wherein:

a convex portion is formed on a mounting surface on which the head slider of the sub-mount is mounted; and the head slider is bonded to the mounting surface with a part of the head slider contacting a top face of the convex portion.

13. A head assembly including the thermally assisted magnetic recording head according to claim 9.

* * * * *